(12) United States Patent
Florissi et al.

(10) Patent No.: US 10,511,659 B1
(45) Date of Patent: Dec. 17, 2019

(54) GLOBAL BENCHMARKING AND STATISTICAL ANALYSIS AT SCALE

(71) Applicant: EMC Corporation, Hopkinton, MA (US)

(72) Inventors: Patricia Gomes Soares Florissi, Briarcliff Manor, NY (US); Ido Singer, Nes Ziona (IL); Ofri Masad, Beer-Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 149 days.

(21) Appl. No.: 15/827,663

(22) Filed: Nov. 30, 2017

Related U.S. Application Data

(63) Continuation-in-part of application No. 14/982,341, filed on Dec. 29, 2015, now Pat. No. 10,015,106.

(60) Provisional application No. 62/143,404, filed on Apr. 6, 2015, provisional application No. 62/143,685, filed on Apr. 6, 2015, provisional application No. 62/436,709, filed on Dec. 20, 2016.

(51) Int. Cl.
*H04L 29/08* (2006.01)

(52) U.S. Cl.
CPC ...... *H04L 67/1089* (2013.01); *H04L 67/1097* (2013.01)

(58) Field of Classification Search
CPC ......... G06F 17/30424; H04L 29/08135; H04L 67/10
See application file for complete search history.

(56) References Cited

U.S. PATENT DOCUMENTS

| | | | |
|---|---|---|---|
| 6,112,225 | A | 8/2000 | Kraft et al. |
| 6,516,350 | B1 | 2/2003 | Lumelsky et al. |
| 7,657,537 | B1 | 2/2010 | Corbett |
| 7,934,018 | B1 | 4/2011 | Lavallee et al. |

(Continued)

OTHER PUBLICATIONS

X. Wu et al., "Privacy Preserving Data Mining Research: Current Status and Key Issues," Proceedings of the 7th International Conference on Computational Science, Part III: ICCS 2007, May 2007, pp. 762-772.

(Continued)

*Primary Examiner* — Shean Tokuta
(74) *Attorney, Agent, or Firm* — Ryan, Mason & Lewis, LLP

(57) ABSTRACT

An apparatus in one embodiment comprises at least one processing device having a processor coupled to a memory. The processing device is configured to receive results of intermediate statistical computations performed on respective ones of a plurality of datasets in respective ones of a plurality of distributed processing nodes configured to communicate over at least one network. The processing device is further configured to perform at least one global statistical computation based at least in part on the results of the intermediate statistical computations, and to utilize a result of the global statistical computation to perform one or more benchmarking operations for specified parameters relating to the plurality of datasets. The distributed processing nodes are associated with respective distinct data zones in which the respective datasets are locally accessible to the respective distributed processing nodes. At least a subset of the receiving, performing and utilizing are repeated in each of a plurality of iterations.

20 Claims, 9 Drawing Sheets

(56) References Cited

U.S. PATENT DOCUMENTS

| | | | |
|---|---|---|---|
| 7,934,248 B1 | 4/2011 | Yehuda et al. | |
| 7,953,843 B2* | 5/2011 | Cherkasova | H04L 29/06027 709/224 |
| 8,224,825 B2 | 7/2012 | Wang et al. | |
| 8,392,564 B1* | 3/2013 | Czajkowski | H04L 41/5051 709/226 |
| 8,499,331 B1 | 7/2013 | Yehuda et al. | |
| 8,706,798 B1* | 4/2014 | Suchter | G06F 9/5038 709/202 |
| 8,732,118 B1* | 5/2014 | Cole | G06F 16/254 707/607 |
| 8,806,061 B1 | 8/2014 | Lobo et al. | |
| 8,873,836 B1* | 10/2014 | Dietrich | G06K 9/00973 382/155 |
| 8,886,649 B2* | 11/2014 | Zhang | G06F 16/93 707/737 |
| 8,938,416 B1* | 1/2015 | Cole | G06F 16/283 707/607 |
| 9,020,802 B1* | 4/2015 | Florissi | G06F 9/445 703/24 |
| 9,031,992 B1 | 5/2015 | Florissi et al. | |
| 9,130,832 B1* | 9/2015 | Boe | G06F 16/24 |
| 9,158,843 B1* | 10/2015 | Florissi | H04L 67/1097 |
| 9,229,952 B1* | 1/2016 | Meacham | G06F 16/219 |
| 9,235,446 B2* | 1/2016 | Bruno | G06F 9/5066 |
| 9,239,711 B1* | 1/2016 | Mistry | G06F 9/5072 |
| 9,280,381 B1 | 3/2016 | Florissi et al. | |
| 9,338,218 B1 | 5/2016 | Florissi et al. | |
| 9,361,263 B1 | 6/2016 | Florissi et al. | |
| 9,418,085 B1* | 8/2016 | Shih | G06F 16/211 |
| 9,451,012 B1* | 9/2016 | Neill | H04L 67/1012 |
| 9,489,233 B1* | 11/2016 | Florissi | G06F 9/5072 |
| 9,613,124 B2* | 4/2017 | Rabinowitz | H04L 43/00 |
| 9,659,057 B2* | 5/2017 | Tian | G06F 16/2471 |
| 9,678,497 B2* | 6/2017 | Karypis | G05B 19/0421 |
| 9,697,262 B2 | 7/2017 | Chandramouli et al. | |
| 9,747,127 B1 | 8/2017 | Florissi et al. | |
| 9,747,128 B1 | 8/2017 | Vijendra et al. | |
| 9,767,149 B2* | 9/2017 | Ozcan | G06F 16/2471 |
| 9,805,170 B2* | 10/2017 | Keyes | G06F 19/3481 |
| 9,832,068 B2* | 11/2017 | McSherry | H04L 29/08135 |
| 9,838,410 B2* | 12/2017 | Muddu | G06F 16/254 |
| 9,848,041 B2* | 12/2017 | Einkauf | H04L 67/1076 |
| 9,996,662 B1 | 6/2018 | Florissi et al. | |
| 10,015,106 B1 | 7/2018 | Florissi et al. | |
| 10,111,492 B2 | 10/2018 | Florissi et al. | |
| 10,114,923 B1 | 10/2018 | Florissi et al. | |
| 10,122,806 B1 | 11/2018 | Florissi et al. | |
| 10,127,352 B1 | 11/2018 | Florissi et al. | |
| 10,270,707 B1 | 4/2019 | Florissi et al. | |
| 10,277,668 B1 | 4/2019 | Florissi | |
| 10,311,363 B1 | 6/2019 | Florissi et al. | |
| 10,331,380 B1 | 6/2019 | Florissi et al. | |
| 10,348,810 B1 | 7/2019 | Florissi et al. | |
| 2002/0073167 A1 | 6/2002 | Powell et al. | |
| 2003/0212741 A1 | 11/2003 | Giasco | |
| 2004/0247198 A1* | 12/2004 | Ghosh | G06T 5/20 382/260 |
| 2005/0010712 A1 | 1/2005 | Kim et al. | |
| 2005/0102354 A1 | 5/2005 | Hollenbeck et al. | |
| 2005/0114476 A1 | 5/2005 | Chen et al. | |
| 2005/0132297 A1 | 6/2005 | Milic-Frayling et al. | |
| 2005/0153686 A1 | 7/2005 | Kall et al. | |
| 2005/0165925 A1 | 7/2005 | Dan et al. | |
| 2005/0266420 A1 | 12/2005 | Pusztai et al. | |
| 2006/0002383 A1 | 1/2006 | Jeong et al. | |
| 2006/0122927 A1 | 6/2006 | Huberman et al. | |
| 2006/0126865 A1 | 6/2006 | Blamey et al. | |
| 2007/0026426 A1 | 2/2007 | Fuernkranz et al. | |
| 2007/0076703 A1 | 4/2007 | Yoneda et al. | |
| 2007/0088703 A1 | 4/2007 | Kasiolas et al. | |
| 2008/0027954 A1 | 1/2008 | Gan et al. | |
| 2008/0028086 A1 | 1/2008 | Chetuparambil et al. | |
| 2008/0077607 A1 | 3/2008 | Gatawood et al. | |
| 2008/0155100 A1 | 6/2008 | Ahmed et al. | |
| 2008/0279167 A1 | 11/2008 | Cardei et al. | |
| 2009/0062623 A1 | 3/2009 | Cohen et al. | |
| 2009/0076851 A1 | 3/2009 | Rao | |
| 2009/0150084 A1 | 6/2009 | Colwell et al. | |
| 2009/0198389 A1 | 8/2009 | Kirchhof-Falter et al. | |
| 2009/0310485 A1 | 12/2009 | Averi et al. | |
| 2009/0319188 A1 | 12/2009 | Otto | |
| 2010/0005077 A1* | 1/2010 | Krishnamurthy | G06F 16/24542 707/E17.136 |
| 2010/0042809 A1 | 2/2010 | Schenfeld et al. | |
| 2010/0076845 A1* | 3/2010 | Ramer | G06Q 30/0243 705/14.52 |
| 2010/0076856 A1 | 3/2010 | Mullins | |
| 2010/0122065 A1 | 5/2010 | Dean et al. | |
| 2010/0131639 A1 | 5/2010 | Narayana et al. | |
| 2010/0184093 A1 | 7/2010 | Donovan et al. | |
| 2010/0229178 A1 | 9/2010 | Ito | |
| 2010/0250646 A1* | 9/2010 | Dunagan | H04L 67/2804 709/203 |
| 2010/0290468 A1 | 11/2010 | Lynam et al. | |
| 2010/0293334 A1 | 11/2010 | Xun et al. | |
| 2010/0299437 A1 | 11/2010 | Moore | |
| 2011/0020785 A1 | 1/2011 | Lowery, Jr. et al. | |
| 2011/0029999 A1 | 2/2011 | Foti | |
| 2011/0103364 A1 | 5/2011 | Li | |
| 2011/0145828 A1 | 6/2011 | Takahashi et al. | |
| 2011/0208703 A1* | 8/2011 | Fisher | G06F 16/88 707/692 |
| 2011/0314002 A1 | 12/2011 | Oliver et al. | |
| 2012/0030599 A1 | 2/2012 | Butt et al. | |
| 2012/0191699 A1* | 7/2012 | George | G06F 16/24554 707/718 |
| 2013/0035956 A1 | 2/2013 | Carmeli et al. | |
| 2013/0044925 A1 | 2/2013 | Kozuka et al. | |
| 2013/0054670 A1 | 2/2013 | Keyes et al. | |
| 2013/0194928 A1 | 8/2013 | Iqbal | |
| 2013/0246460 A1 | 9/2013 | Maltbie et al. | |
| 2013/0282897 A1* | 10/2013 | Siegel | H04L 43/0876 709/224 |
| 2013/0290249 A1 | 10/2013 | Merriman et al. | |
| 2013/0291118 A1 | 10/2013 | Li et al. | |
| 2013/0318257 A1 | 11/2013 | Lee et al. | |
| 2013/0326538 A1* | 12/2013 | Gupta | G06F 9/50 718/107 |
| 2013/0346229 A1 | 12/2013 | Martin et al. | |
| 2013/0346988 A1 | 12/2013 | Bruno et al. | |
| 2014/0012843 A1 | 1/2014 | Soon-Shiong | |
| 2014/0025393 A1 | 1/2014 | Wang et al. | |
| 2014/0032240 A1* | 1/2014 | Lougheed | G06Q 50/24 705/3 |
| 2014/0075161 A1 | 3/2014 | Zhang et al. | |
| 2014/0081984 A1* | 3/2014 | Sitsky | G06F 16/31 707/741 |
| 2014/0082178 A1 | 3/2014 | Boldyrev et al. | |
| 2014/0143251 A1* | 5/2014 | Wang | G06F 16/285 707/737 |
| 2014/0173331 A1 | 6/2014 | Martin et al. | |
| 2014/0173618 A1* | 6/2014 | Neuman | G06F 9/5066 718/104 |
| 2014/0214752 A1* | 7/2014 | Rash | G06F 16/254 707/600 |
| 2014/0215007 A1* | 7/2014 | Rash | H04L 67/1002 709/217 |
| 2014/0278808 A1* | 9/2014 | Iyoob | G06Q 30/0206 705/7.35 |
| 2014/0279201 A1* | 9/2014 | Iyoob | G06Q 30/0631 705/26.7 |
| 2014/0280298 A1 | 9/2014 | Petride et al. | |
| 2014/0280363 A1 | 9/2014 | Heng et al. | |
| 2014/0280604 A1 | 9/2014 | Ahiska et al. | |
| 2014/0280990 A1 | 9/2014 | Dove et al. | |
| 2014/0310258 A1* | 10/2014 | Tian | G06F 16/2471 707/718 |
| 2014/0310718 A1 | 10/2014 | Gerphagnon et al. | |
| 2014/0320497 A1 | 10/2014 | Vojnovic et al. | |

(56) References Cited

U.S. PATENT DOCUMENTS

| | | | |
|---|---|---|---|
| 2014/0324647 A1* | 10/2014 | Iyoob | G06Q 40/12 705/30 |
| 2014/0325041 A1 | 10/2014 | Xu et al. | |
| 2014/0358999 A1 | 12/2014 | Rabinowitz et al. | |
| 2014/0365518 A1 | 12/2014 | Calo et al. | |
| 2014/0365662 A1* | 12/2014 | Dave | G06F 9/45533 709/226 |
| 2014/0372611 A1* | 12/2014 | Matsuda | H04L 45/12 709/225 |
| 2014/0379722 A1 | 12/2014 | Mysur et al. | |
| 2015/0006619 A1* | 1/2015 | Banadaki | H04L 67/10 709/203 |
| 2015/0019710 A1 | 1/2015 | Shaashua et al. | |
| 2015/0039586 A1* | 2/2015 | Kerschbaum | G06F 16/24542 707/718 |
| 2015/0039667 A1* | 2/2015 | Shah | H04L 67/1044 709/201 |
| 2015/0058843 A1* | 2/2015 | Holler | G06F 9/455 718/1 |
| 2015/0066646 A1* | 3/2015 | Sriharsha | G06Q 30/0256 705/14.54 |
| 2015/0081877 A1 | 3/2015 | Sethi et al. | |
| 2015/0088786 A1 | 3/2015 | Anandhakrishnan | |
| 2015/0092561 A1* | 4/2015 | Sigoure | H04L 49/50 370/236 |
| 2015/0120791 A1* | 4/2015 | Gummaraju | G06F 9/45558 707/823 |
| 2015/0121371 A1* | 4/2015 | Gummaraju | G06F 9/45533 718/1 |
| 2015/0169683 A1 | 6/2015 | Chandramouli et al. | |
| 2015/0178052 A1 | 6/2015 | Gupta et al. | |
| 2015/0193583 A1* | 7/2015 | McNair | G16H 50/20 705/2 |
| 2015/0201036 A1* | 7/2015 | Nishiki | H04L 67/1095 709/224 |
| 2015/0222723 A1* | 8/2015 | Adapalli | H04L 67/2809 705/26.41 |
| 2015/0254344 A1 | 9/2015 | Kulkarni et al. | |
| 2015/0254558 A1* | 9/2015 | Arnold | G06F 16/245 700/19 |
| 2015/0264122 A1* | 9/2015 | Shau | H04L 67/10 709/203 |
| 2015/0269230 A1* | 9/2015 | Kardes | G06Q 50/01 707/692 |
| 2015/0273513 A1 | 10/2015 | Krasin et al. | |
| 2015/0277791 A1* | 10/2015 | Li | G06F 3/0689 711/114 |
| 2015/0295781 A1 | 10/2015 | Maes | |
| 2015/0302075 A1* | 10/2015 | Schechter | G06F 9/5066 707/641 |
| 2015/0339210 A1* | 11/2015 | Kopp | G06F 11/3495 718/100 |
| 2015/0355946 A1 | 12/2015 | Kang | |
| 2015/0369618 A1 | 12/2015 | Barnard et al. | |
| 2016/0004827 A1 | 1/2016 | Silva et al. | |
| 2016/0063191 A1 | 3/2016 | Vesto et al. | |
| 2016/0072726 A1 | 3/2016 | Soni et al. | |
| 2016/0087909 A1 | 3/2016 | Chatterjee et al. | |
| 2016/0098021 A1 | 4/2016 | Zornio et al. | |
| 2016/0098472 A1* | 4/2016 | Appleton | G06F 16/245 707/737 |
| 2016/0098662 A1* | 4/2016 | Voss | G06Q 10/06316 705/7.26 |
| 2016/0112531 A1 | 4/2016 | Milton et al. | |
| 2016/0125056 A1* | 5/2016 | Knezevic | G06F 16/258 707/722 |
| 2016/0132576 A1* | 5/2016 | Qi | G06F 16/27 707/600 |
| 2016/0170882 A1 | 6/2016 | Choi et al. | |
| 2016/0179642 A1 | 6/2016 | Cai | |
| 2016/0179979 A1 | 6/2016 | Aasman et al. | |
| 2016/0182305 A1 | 6/2016 | Martin et al. | |
| 2016/0182327 A1 | 6/2016 | Coleman, Jr. et al. | |
| 2016/0188594 A1* | 6/2016 | Ranganathan | G06F 16/24552 707/769 |
| 2016/0196324 A1* | 7/2016 | Haviv | G06F 16/122 707/626 |
| 2016/0205106 A1 | 7/2016 | Yacoub et al. | |
| 2016/0241893 A1 | 8/2016 | Allhands et al. | |
| 2016/0246981 A1* | 8/2016 | Nakagawa | G09C 1/00 |
| 2016/0260023 A1 | 9/2016 | Miserendino, Jr. et al. | |
| 2016/0261727 A1* | 9/2016 | Yang | H04L 65/4084 |
| 2016/0267132 A1 | 9/2016 | Castellanos et al. | |
| 2016/0269228 A1 | 9/2016 | Franke et al. | |
| 2016/0323377 A1* | 11/2016 | Einkauf | H04L 67/1076 |
| 2016/0328661 A1* | 11/2016 | Reese | G06F 16/29 |
| 2016/0337473 A1 | 11/2016 | Rao | |
| 2016/0350157 A1 | 12/2016 | Necas | |
| 2017/0006135 A1* | 1/2017 | Siebel | H04L 67/02 |
| 2017/0032263 A1 | 2/2017 | Yuan et al. | |
| 2017/0083573 A1 | 3/2017 | Rogers et al. | |
| 2017/0109299 A1* | 4/2017 | Belair | G06F 13/1668 |
| 2017/0116289 A1* | 4/2017 | Deshmukh | G06F 16/24535 |
| 2017/0149630 A1* | 5/2017 | Feller | H04L 41/0893 |
| 2017/0155707 A1* | 6/2017 | Rash | H04L 67/1002 |
| 2017/0187785 A1 | 6/2017 | Johnson et al. | |
| 2017/0220646 A1* | 8/2017 | Schechter | G06F 9/5066 |
| 2017/0272458 A1* | 9/2017 | Muddu | G06F 16/254 |
| 2017/0323028 A1* | 11/2017 | Jonker | G06F 16/9024 |
| 2017/0337135 A1* | 11/2017 | Hu | G06F 16/9024 |
| 2017/0346690 A1* | 11/2017 | Dorado | H04L 41/5045 |
| 2018/0054355 A1 | 2/2018 | Balser et al. | |
| 2018/0101583 A1 | 4/2018 | Li et al. | |
| 2018/0189296 A1 | 7/2018 | Ashour et al. | |
| 2018/0308585 A1 | 10/2018 | Holmes et al. | |

OTHER PUBLICATIONS

M.K. Gardner et al., "Parellel Genomic Sequence-Searching on an Ad-Hoc Grid: Experiences, Lessons Learned, and Implications," Proceedings of the 2006 ACM/IEEE SC/06 Conference, IEEE Computer Society, 2006, 14 pages.

A.G. Craig et al., "Ordering of Cosmid Clones Covering the Herpes Simplex Virus Type I (HSV-1) Genome: A Test Case for Fingerprinting by Hybridisation," Nucleic Acids Research, vol. 18, 1990, pp. 2653-2660, T.R. Golub et al., "Molecular classification of Cancer: Class Discovery and Class Prediction by Gene Expression Monitoring," Science, vol. 286, Oct. 15, 1999, pp. 531-537.

D. Singh et al., "Expression Correlates of Clinical Prostate Cancer Behavior," Cancer Cell, vol. 1, Mar. 2002, pp. 203-209.

A.P. Kulkarni et al., "Survey on Hadoop and Introduction to YARN," International Journal of Emerging Technology and Advanced Engineering, May 2014, pp. 82-87, vol. 4, No. 5.

R.R. Miller et al., "Metagenomics for Pathogen Detection in Public Health," Genome Medicine, Sep. 20, 2013, 14 pages, vol. 5, No. 81.

T. Thomas et al., "Metagenomics—A Guide from Sampling to Data Analysis," Microbial Informatics and Experimentation, Oct. 13, 2012, 12 pages, vol. 2, No. 3.

E.R. Ganser et al., "A Technique for Drawing Directed Graphs," IEEE Transactions on Software Engineering, Mar. 1993, pp. 214-230, vol, 19, No. 3.

J. Leskovec, "Graphs Over Time: Densification Laws, Shrinking Diameters arid Possible Explanations," Proceedings of the Eleventh ACM SIGKDD International Conference on Knowledge Discovery in Data Mining, Aug. 21-24, 2005, pp. 177-187.

H. Zha et al., "Bipartite Graph Partitioning arid Data Clustering," Proceedings of the Tenth International Conference on Information and Knowledge Management, Oct. 5-10, 2001, pp. 25-32.

A. Oghabian et al., "Biclustering Methods: Biological Relevance and Application in Gene Expression Analysis," PLOS ONE, Mar. 20, 2014, 10 pages, vol. 9, No. 3.

S. Ryza, "How to: Tune Your Apache Spark Jobs," https://blog.cloudera.com/blog/2015/03/how-to-tune-your-apache-spark-jobs-part-1/, Mar. 9, 2015, 23 pages.

T. White, "Hadoop: The Definitive Guide," O'Reilly Media, Inc., Fourth Edition, Sebastopol, CA, Apr. 2015, 756 pages.

(56) References Cited

OTHER PUBLICATIONS

L. Shashank, "Spark on Yarn," https://www.slideshare.net/datamantra/spark-on-yarn-54201193, Oct. 21, 2015, 47 pages.

U.S. Appl. No. 14/982,341 filed in the name of Patricia Gomes Soares Florissi et al., filed Dec. 29, 2015 and entitled "Multi-Cluster Distributed Data Processing Platform."

U.S. Appl. No. 14/982,351 filed in the name of Patricia Gomes Soares Florissi et al., filed Dec. 29, 2015 and entitled "Distributed Catalog Service for Multi-Cluster Data Processing Platform."

U.S. Appl. No. 15/395,340 filed in the name of Bryan Duerk et al., filed Dec. 30, 2016 and entitled "Data-Driven Automation Mechanism for Analytics Workload Distribution."

Wikipedia, "Apache Spark," https://en.wikipedia.org/wiki/Apache_Spark, Apr. 10, 2017, 6 pages.

U.S. Appl. No. 15/485,843 filed in the name of Patricia Gomes Soares Florissi et al., filed Apr. 12, 2017 and entitled "Scalable Distributed In-Memory Computation."

U.S. Appl. No. 15/582,743 filed in the name of Patricia Gomes Soares Florissi et al., filed Apr. 30, 2017 and entitled "Scalable Distributed In-Memory Computation Utilizing Batch Mode Extensions."

Dell, "Dell Boomi Platform: Connect Every Part of Your Business to Transform How You do Business," https://marketing.boomi.com/rs/777-AVU-348/images/Boomi-Integration-Cloud.pdf, 2017, 4 pages.

V.K. Vavilapalli et al., "Apache Hadoop YARN: Yet Another Resource Negotiator," Proceedings of the 4th Annual Symposium on Cloud Computing (SOCC), Article No. 5, Oct. 2013, 16 pages.

A.C. Murthy et al., "Apache Hadoop YARN: Moving beyond MapReduce and Batch Processing with Apache Hadoop 2," Addison-Wesley Professional, Mar. 29, 2014, 78 pages.

Global Alliance for Genomics and Health, "Beacons," https://genomicsandhealth.org/work-products-demonstration-projects/beacons, Jun. 27, 2014, 2 pages.

Data Working Group, "Global Alliance Genomics API," http://ga4gh.org/#/documentation, Dec. 28, 2015, 2 pages.

Aaron Krol, "Beacon Project Cracks the Door for Genomic Data Sharing," http://www.bio-itworld.com/2015/8/14/beacon-project-cracks-door-genomic-data-sharing.html, Aug. 14, 2015, 3 pages.

U.S. Appl. No. 15/281,248 filed in the name of Patricia Gomes Soares Florissi et al., filed Sep. 30, 2016 and entitled "Methods and Apparatus Implementing Data Model for Disease Monitoring, Characterization and Investigation."

P.P. Jayaraman et al., "Analytics-as-a-Service in a Multi-Cloud Environment Through Semantically-Enabled Hierarchical Data Processing," Software: Practice and Experience, Aug. 2017, pp. 1139-1156, vol. 47, No. 8.

J.Y.L. Lee et al., "Sufficiency Revisited: Rethinking Statistical Algorithms in the Big Data Era," The American Statistician, Dec. 15, 2016, 22 pages.

S. Wang et al., "Genome Privacy: Challenges, Technical Approaches to Mitigate Risk, and Ethical Considerations in the United States," Annals of the New York Academy of Sciences, Jan. 2017, pp. 73-83, vol. 1387, No. 1.

K. Xu et al., "Privacy-Preserving Machine Learning Algorithms for Big Data Systems," IEEE 35th International Conference on Distributed Computing Systems (ICDCS), Jun. 29-Jul. 2, 2015, pp. 318-327.

\* cited by examiner

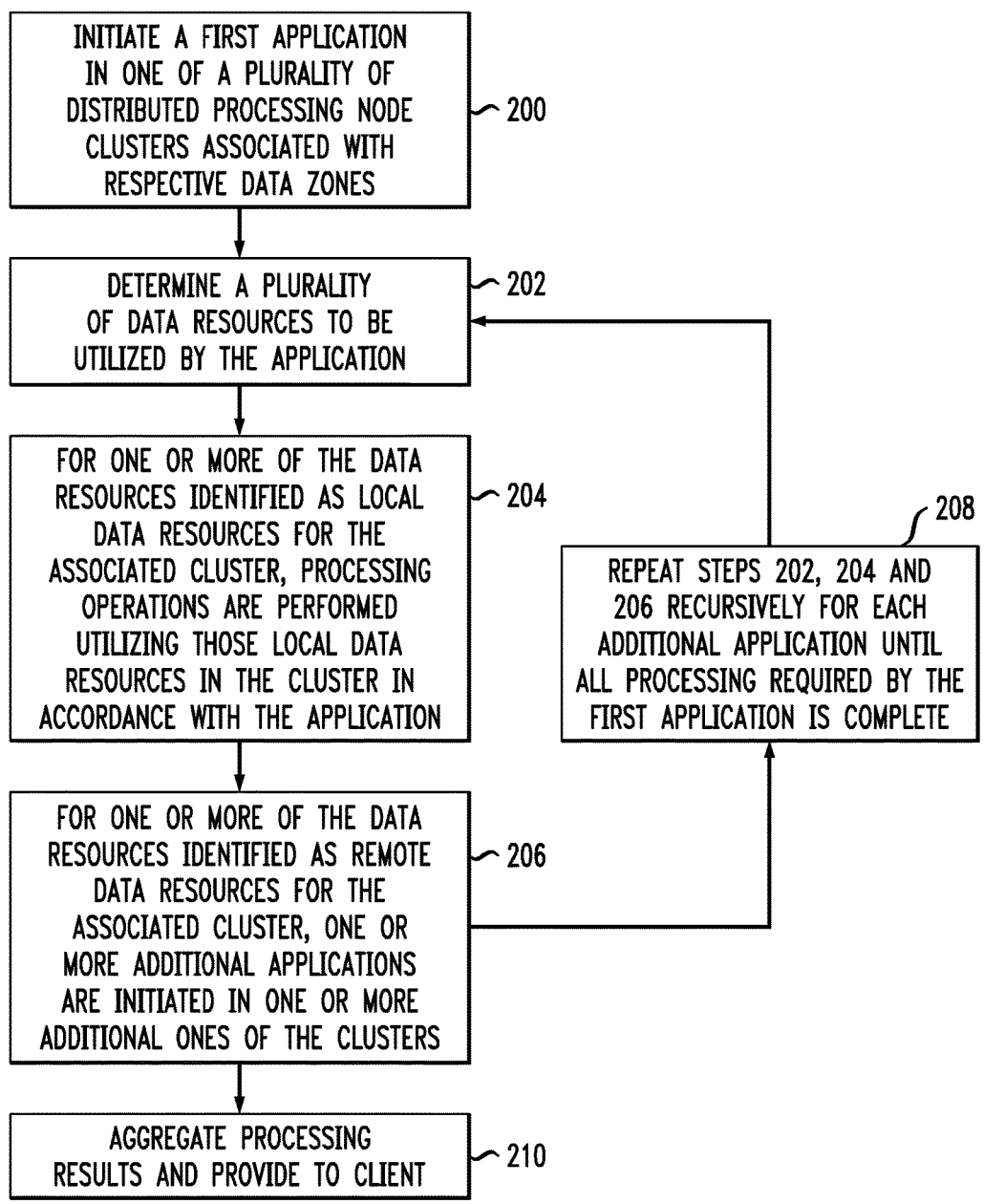

FIG. 8

WORLD WIDE SCALE OF DATA LOCALITY PRINCIPLE

| | |
|---|---|
| RESOURCE EFFICIENT & BANDWIDTH OPTIMIZED APPROACH TO ANALYZE DISTRIBUTED "BIG DATA" | • ELIMINATES TIME WASTED IN TRANSFERRING DATA, OPTIMIZES BANDWIDTH & INTERMEDIATE STORAGE COSTS.<br>• ADDRESSES BACKHAUL BANDWIDTH CONSTRAINTS IMPOSED BY BIG DATA - VOLUME & SIZE THAT IS OUTPACING BACKBONE BANDWIDTH MAKING CENTRALIZED ANALYTICS IMPRACTICAL.<br>• CAPITALIZES ON MOVING COMPUTE CLOSE TO DATA - OPTIMALLY MOVE INSIGHTS INSTEAD OF RAW DATA. |
| UNIQUE APPROACH TO ADDRESS SECURITY & GOVERNANCE, RISK & COMPLIANCE (GRC) CONSTRAINTS | • OVERCOMES GRC CONSTRAINTS ASSOCIATED WITH MOVING DATA ACROSS CERTAIN GEOGRAPHICAL AND/OR POLITICAL BOUNDARIES.<br>• DATA OWNERSHIP IS RETAINED WITH SECURE DATA ACCESS TO ENABLE TRUSTED COLLABORATION & DATA SHARING. |
| ENABLES NOVEL BUSINESS MODELS & FOSTERS TRUSTED COLLABORATION | • PERMITS CONSUMPTION BASED MODEL FOR WORLD WIDE SCALE FEDERATED ANALYTICS.<br>• ENABLES SERVICE PROVIDERS TO ENHANCE IaaS & PaaS WITH BIG DATA ANALYTICS OFFERINGS.<br>• ENABLES PROVIDERS TO ORCHESTRATE & MONETIZE RICH & EVER EXPANDING PUBLIC DATA SETS.<br>• CREATES AN ECOSYSTEM FOR APPLICATION DEVELOPERS TO EXTRACT & MARKET BIG DATA INSIGHT, WITHOUT THE NEED TO ACTUALLY OWN OR COPY BIG DATA.<br>• ENABLES ENTERPRISES TO DEVELOP NEW CLOUD SERVICES THAT LEVERAGE THE FEDERATED ANALYTICAL PLATFORM.<br>• FACILITATES COLLABORATION OF PEER-TO-PEER DATA & SHARING OF INFRASTRUCTURE RESOURCES. |

GLOBAL BENCHMARKING AND STATISTICAL ANALYSIS AT SCALE

RELATED APPLICATIONS

The present application is a continuation-in-part of U.S. patent application Ser. No. 14/982,341, filed Dec. 29, 2015 and entitled "Multi-Cluster Distributed Data Processing Platform," now U.S. Pat. No. 10,015,106, which is incorporated by reference herein in its entirety, and which claims priority to U.S. Provisional Patent Application Ser. No. 62/143,404, entitled "World Wide Hadoop Platform," and U.S. Provisional Patent Application Ser. No. 62/143,685, entitled "Bioinformatics," both filed Apr. 6, 2015, and incorporated by reference herein in their entirety. The present application also claims priority to U.S. Provisional Application Ser. No. 62/436,709, filed Dec. 20, 2016 and entitled "Global Benchmarking and Statistical Analysis at Scale," which is incorporated by reference herein in its entirety.

FIELD

The field relates generally to information processing systems, and more particularly to information processing systems that implement distributed processing across a plurality of processing nodes.

BACKGROUND

The need to extract knowledge from data collected on a global scale continues to grow. In many cases the data may be dispersed across multiple geographic locations, owned by different entities, and in different formats. Although numerous distributed data processing frameworks exist today, these frameworks have significant drawbacks. For example, data-intensive computing tasks often use data processing frameworks such as MapReduce or Spark. However, these frameworks typically require deployment of a distributed file system shared by all of the processing nodes, and are therefore limited to data that is accessible via the shared distributed file system. Such a shared distributed file system can be difficult to configure and maintain over multiple local sites that are geographically dispersed and possibly also subject to the above-noted differences in ownership and data format. In the absence of a shared distributed file system, conventional arrangements may require that data collected from sources in different geographic locations be copied from their respective local sites to a single centralized site configured to perform data analytics. Such an arrangement is not only slow and inefficient, but it can also raise serious privacy concerns regarding the copied data.

SUMMARY

Illustrative embodiments of the present invention provide information processing systems that are configured to execute distributed applications over multiple distributed processing nodes associated with respective distinct data zones. These and other similar arrangements disclosed herein can be advantageously configured to provide analytics functionality in a decentralized and privacy-preserving manner, so as to overcome the above-noted drawbacks of conventional systems. This is achieved in some embodiments by orchestrating execution of distributed applications across the multiple nodes. The nodes in some embodiments may be part of respective clusters of multiple nodes. Computations associated with data available locally to a given node or set of nodes are performed within that node or nodes. Accordingly, instead of moving data from local sites to a centralized site, computations are performed within the local sites where the needed data is available. Such arrangements can provide significant advantages in terms of both performance and privacy, while also conserving bandwidth and reducing energy consumption. Additional advantages are provided in terms of security, governance, risk and compliance.

Some illustrative embodiments utilize distributed processing nodes to implement functionality for Global Benchmarking and Statistical Analysis at Scale (GBSAS).

In one illustrative embodiment implementing GBSAS functionality, an apparatus comprises at least one processing device having a processor coupled to a memory. The processing device is configured to receive results of intermediate statistical computations performed on respective ones of a plurality of datasets in respective ones of a plurality of distributed processing nodes configured to communicate over at least one network. The processing device is further configured to perform at least one global statistical computation based at least in part on the results of the intermediate statistical computations, and to utilize a result of the global statistical computation to perform one or more benchmarking operations for specified parameters relating to the plurality of datasets.

The distributed processing nodes are associated with respective distinct data zones in which the respective datasets are locally accessible to the respective distributed processing nodes. For example, the distributed processing nodes may be implemented in respective cloud-based data centers each configured to store locally accessible datasets of its corresponding data zone.

At least a subset of the receiving, performing and utilizing operations implemented by the processing device are repeated in each of a plurality of iterations, and a result of the global statistical computation in a first one of the iterations is passed as an input to the intermediate statistical computations in a second one of the iterations. For example, results of local computations performed by respective ones of the distributed processing nodes can be shared with other ones of the distributed processing nodes and utilized to perform a wide variety of other computations over multiple iterations.

These and other illustrative embodiments include, without limitation, methods, apparatus, systems, and processor-readable storage media.

BRIEF DESCRIPTION OF THE DRAWINGS

FIG. 2 is a flow diagram of an exemplary process implemented in the multi-cluster distributed data processing platform of FIG. 1.

FIG. 8 lists advantages of some distributed data processing platforms in illustrative embodiments.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, a plurality of data centers each comprising one or more clouds hosting multiple tenants that share cloud resources.

Figure 1:
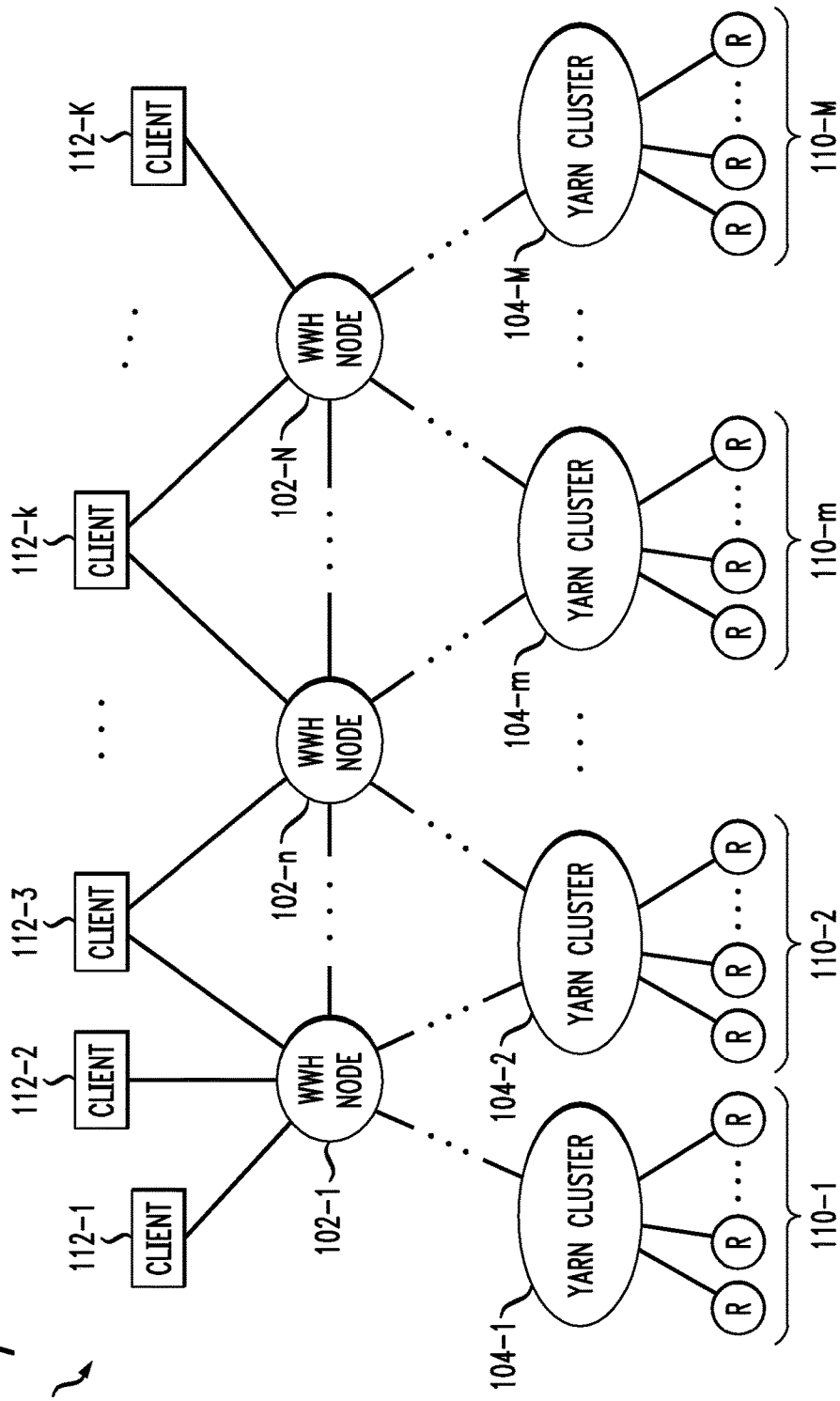
FIG. 1 is a block diagram of an information processing system comprising a multi-cluster distributed data processing platform in an illustrative embodiment of the invention.

FIG. 1 shows an information processing system 100 comprising a multi-cluster distributed data processing platform in an illustrative embodiment. The system 100 comprises a plurality of processing nodes 102, individually denoted as 102-1, . . . 102-n, . . . 102-N, each of which communicates with one or more Apache Hadoop YARN ("Yet Another Resource Negotiator") clusters, individually denoted as 104-1, 104-2, . . . 104-m, . . . 104-M. The processing nodes 102 are configured to communicate with one another and with their associated YARN clusters 104 over one or more networks that are not explicitly shown in the figure. Apache Hadoop YARN is also referred to as Hadoop 2.0, and is described in, for example, V. K. Vavilapalli et al., "Apache Hadoop YARN: Yet Another Resource Negotiator," Proceedings of the 4th Annual Symposium on Cloud Computing, SOCC '13, pp. 5:1-5:16, ACM, New York, N.Y., USA, 2013, which is incorporated by reference herein. Alternatively, the nodes 104-1, 104-2, . . . 104-m, . . . 104-M could represent any arrangement of distributed processing nodes, not necessarily supporting the YARN framework.

The processing nodes 102 are illustratively implemented as respective worldwide data nodes, and more particularly as respective worldwide Hadoop (WWH) nodes, although numerous alternative processing node types can be used in other embodiments, and other embodiments need not utilize WWH, YARN or Hadoop. The WWH nodes in the present embodiment are assumed to be configured to perform operations in accordance with any framework supported by Hadoop YARN clusters comprising respective ones of the YARN clusters 104. Examples of frameworks supported by each of the Hadoop YARN clusters include MapReduce, Spark, Hive, MPI and numerous others.

The acronym WWH as used herein is additionally or alternatively intended to refer to a "worldwide herd" arrangement where the term "herd" in this context illustratively connotes multiple geographically-distributed Hadoop platforms, although as indicated previously, references herein to Hadoop and YARN are by way of example only. More generally, WWH in illustrative embodiments is used to denote a worldwide data processing platform potentially comprising multiple clusters. Numerous other arrangements of distributed processing nodes not involving WWH, YARN or Hadoop can be used in implementing illustrative embodiments as disclosed herein.

In the FIG. 1 embodiment, the multi-cluster distributed data processing platform more particularly comprises a WWH platform having one or more layers of WWH nodes 102 and a plurality of potentially geographically-distributed YARN clusters 104. Each of the YARN clusters 104 comprises a corresponding cluster of distributed processing nodes. The WWH platform is illustratively configured for worldwide scale, geographically-dispersed computations and other types of cluster-based processing based on locally-accessible data resources, as will be described in more detail elsewhere herein.

It is to be appreciated that a wide variety of other types of processing nodes 102 can be used in other embodiments. Accordingly, the use of WWH nodes in the FIG. 1 embodiment and other embodiments disclosed herein is by way of illustrative example only, and should not be construed as limiting in any way.

It should also be noted that one or more of the WWH nodes 102 in some embodiments can be part of a corresponding one of the YARN clusters 104. For example, in some embodiments of a WWH platform as disclosed herein, the YARN clusters 104 themselves each comprise one or more layers of WWH nodes. Accordingly, these and other embodiments need not include a separate layer of WWH nodes 102 above the YARN clusters 104. The WWH nodes 102 may be viewed as examples of what are more generally referred to herein as distributed processing nodes. The YARN clusters 104 are each also assumed to comprise a plurality of additional or alternative distributed processing nodes.

Each YARN cluster 104 includes a resource manager for that cluster, and from a larger perspective YARN can be viewed as a cluster-wide operating system that allows applications to utilize the dynamic and parallel resource infrastructure a computer cluster offers. However, conventional YARN implementations are generally configured to operate in single-cluster environments, and do not provide any support for managing distributed applications which span across more than one cluster.

The WWH platform in the FIG. 1 embodiment is an example of what is more generally referred to herein as a "multi-cluster distributed data processing platform." This WWH platform and other WWH platforms disclosed herein advantageously extends YARN to multi-cluster environments. For example, the WWH platform in some embodiments is configured to orchestrate the execution of distributed WWH applications on a worldwide scale, across multiple, potentially geographically-distributed YARN clusters. The WWH platform therefore provides a platform for running distributed applications across multiple data zones each having a corresponding YARN cluster.

Other types of multi-cluster distributed data processing platforms may be implemented in other embodiments. Accordingly, references herein to a WWH platform, YARN clusters and associated features are intended as illustrative examples only, and should not be construed as limiting in any way. For example, other embodiments can be implemented without using WWH nodes or YARN clusters. Accordingly, it should be understood that the distributed data processing techniques disclosed herein are more generally applicable to a wide variety of other types of multi-cluster platforms. Also, embodiments are not limited to clusters but can more generally be implemented using processing platforms configured to provide any arrangement of distributed processing nodes. The distributed processing nodes communicate with one another over one or more networks.

Each of the YARN clusters 104 in the system 100 is associated with a corresponding set of local data resources 110, individually denoted as local data resources sets 110-1, 110-2, . . . 110-m, . . . 110-M. The local data resource sets each provide one or more local data resources to the corresponding YARN cluster for analytics processing. Results of the processing performed within a given YARN cluster utilizing one or more locally available data resources accessible to that YARN cluster are illustratively provided to one or more other ones of the YARN clusters or to an associated one of the WWH nodes 102 for additional processing associated with provision of analytics functionality within the system 100.

The data resources of each of the sets 110 of data resources are individually identified using the letter R in FIG. 1. Although these data resources are illustratively shown as being external to the YARN clusters 104, this is by way of example only and it is assumed in some embodiments that at least a subset of the data resources of a given set 110 are within the corresponding YARN cluster 104. Accordingly, a given YARN cluster can perform processing operations using a combination of internal and external local data resources.

The results of the analytics processing performed by a given one of the YARN clusters 104 illustratively comprise results of local analytics processing using YARN frameworks such as MapReduce, Spark and numerous others.

It should be understood that the above-noted analytics results are merely examples of what are more generally referred to herein as "processing results" of a given cluster. Such results can take different forms in different embodiments, as will be readily appreciated by those skilled in the art. For example, such processing results can comprise local analytics results that have been processed in a variety of different ways within a YARN cluster before being provided to one of more of the WWH nodes 102 for additional processing. Numerous other types of processing results can be used in other embodiments.

The WWH nodes 102 are each coupled to one or more clients 112. By way of example, the set of clients 112 may include one or more desktop computers, laptop computers, tablet computers, mobile telephones or other types of communication devices or other processing devices in any combination. The clients are individually denoted in the figure as clients 112-1, 112-2, . . . 112-k, . . . 112-K. The clients 112 may comprise, for example, respective end users or associated hardware entities, software entities or other equipment entities. For example, a "client" as the term is broadly used herein can comprise a software-implemented entity running on a user device or other processing device within the system 100.

The variables N, M and K denote arbitrary values, as embodiments of the invention can be configured using any desired number of WWH nodes 102, YARN clusters 104 and clients 112. For example, some embodiments may include multiple YARN clusters 104 and multiple clients 112 but only a single WWH node 102, or multiple WWH nodes 102 corresponding to respective ones of the YARN clusters 104. Numerous alternative arrangements are possible, including embodiments in which a single system element combines functionality of at least a portion of a WWH node and functionality of at least a portion of a YARN cluster. Thus, alternative embodiments in which the functions of a WWH node and a YARN cluster are at least partially combined into a common processing entity are possible.

The WWH nodes 102 in some embodiments are implemented at least in part as respective analysis nodes. The analysis nodes may comprise respective computers in a cluster of computers associated with a supercomputer or other high performance computing (HPC) system. The term "processing node" as used herein is intended to be broadly construed, and such nodes in some embodiments may comprise respective compute nodes in addition to or in place of providing analysis node functionality.

The system 100 may include additional nodes that are not explicitly shown in the figure. For example, the system 100 may comprise one or more name nodes. Such name nodes may comprise respective name nodes of a Hadoop Distributed File System (HDFS), although other types of name nodes can be used in other embodiments. Particular objects or other stored data of a storage platform can be made accessible to one or more of the WWH nodes 102 via a corresponding name node. For example, such name nodes can be utilized to allow the WWH nodes 102 to address multiple HDFS namespaces within the system 100.

Each of the WWH nodes 102 and YARN clusters 104 is assumed to comprise one or more databases for storing analytics processing results and possibly additional or alternative types of data.

Databases associated with the WWH nodes 102 or the YARN clusters 104 and possibly other elements of the system 100 can be implemented using one or more storage platforms. For example, a given storage platform can comprise any of a variety of different types of storage including network-attached storage (NAS), storage area networks (SANs), direct-attached storage (DAS), distributed DAS and software-defined storage (SDS), as well as combinations of these and other storage types.

A given storage platform may comprise storage arrays such as VNX® and Symmetrix VMAX® storage arrays, both commercially available from EMC Corporation. Other types of storage products that can be used in implementing a given storage platform in an illustrative embodiment include software-defined storage products such as ScaleIO™ and ViPR®, server-based flash storage devices such as DSSD™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage platform in an illustrative embodiment.

Additionally or alternatively, a given storage platform can implement multiple storage tiers. For example, a storage platform can comprise a 2 TIERS™ storage system from EMC Corporation.

These and other storage platforms can be part of what is more generally referred to herein as a processing platform comprising one or more processing devices each comprising a processor coupled to a memory.

A given processing device may be implemented at least in part utilizing one or more virtual machines or other types of virtualization infrastructure such as Docker containers or other types of Linux containers (LXCs). The WWH nodes 102 and YARN clusters 104, as well as other system components, may be implemented at least in part using processing devices of such processing platforms.

Communications between the various elements of system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

It is to be appreciated that the particular arrangement of system elements shown in FIG. 1 is for purposes of illustration only, and that other arrangements of additional or alternative elements can be used in other embodiments. For example, numerous alternative system configurations can be used to implement multi-cluster distributed data processing functionality as disclosed herein.

Additional details regarding example processing functionality that may be incorporated in at least a subset of the WWH nodes in illustrative embodiments are described in U.S. Pat. No. 9,020,802, entitled "Worldwide Distributed Architecture Model and Management," and U.S. Pat. No. 9,158,843, entitled "Addressing Mechanism for Data at World Wide Scale," which are commonly assigned herewith and incorporated by reference herein.

The operation of the system 100 will now be described in further detail with reference to the flow diagram of FIG. 2. The process as shown includes steps 200 through 204, and is suitable for use in the system 100 but is more generally applicable to other types of multi-cluster distributed data processing platforms.

In step 200, a first application is initiated in one of a plurality of distributed processing node clusters associated with respective data zones, with each of the clusters being configured to perform processing operations utilizing local data resources locally accessible within its corresponding data zone. With reference to the FIG. 1 embodiment, a first application is initiated in one of the YARN clusters 104, possibly via one of the WWH nodes 102, by a given one of the clients 112. The first application is illustratively what is referred to herein as a WWH application, which is a distributed application for which processing is orchestrated over multiple ones of the YARN clusters 104.

In step 202, a plurality of data resources to be utilized by the application are determined. These data resources in the context of the FIG. 1 embodiment illustratively comprise data resources from multiple ones of the data resource sets 110.

In step 204, for one or more of the plurality of data resources that are identified as local data resources, processing operations are performed utilizing the local data resources in the associated cluster in accordance with the first application. Assuming by way of example that the first application in the FIG. 1 embodiment is initiated in the first YARN cluster 104-1, the data resources identified as local data resources would include one or more of the data resources from the set 110-1.

In step 206, for one or more of the plurality of data resources that are identified as remote data resources, respective additional applications are initiated in one or more additional ones of the plurality of distributed processing node clusters. By way of example, if the first application initiated in cluster 104-1 requires processing operations utilizing remote data resources, such as local data resources of another cluster 104-2, an additional application is initiated in cluster 104-2 so that the processing operations can be performed utilizing the local data resources available to cluster 104-2.

The identification of the local or remote status of particular data resources in steps 204 and 206 illustratively involves accessing a distributed catalog service to identify for each of the plurality of data resources to be utilized by the application whether the data resource is a local data resource or a remote data resource. The distributed catalog service is illustratively distributed over the clusters with each of the clusters having visibility of a corresponding distinct portion of the distributed catalog based on its locally accessible data resources. In some embodiments, the distributed catalog service comprises a distributed WWH catalog having a corresponding instance implemented within each of the clusters. Additional details regarding such a WWH catalog and other types of distributed catalog services that may be used in illustrative embodiments will be provided elsewhere herein.

In step 208, steps 202, 204 and 206 are repeated recursively for each additional application that is initiated from the first application until all processing required by the first application is complete.

For example, assume again with reference to the FIG. 1 embodiment that one of the clients 112 initiates the first application as a first YARN application in the first YARN cluster 104-1. The first cluster 104-1 can then initiate the one or more additional applications in the one or more additional clusters 104-2 through 104-M as respective YARN applications for which the first cluster 104-1 serves as a client such that the one or more additional clusters are unaware that the one or more additional applications are part of a multi-cluster distributed application.

Moreover, at least one of the additional clusters may then determine an additional plurality of data resources to be utilized by the corresponding additional application and identify for each of the plurality of additional data resources to be utilized by the additional application whether the data resource is a local data resource that is locally accessible within the data zone of the additional cluster or a remote data resource that is not locally accessible within the data zone of the additional cluster.

If the additional plurality of data resources includes one or more remote data resources not locally accessible to the additional cluster, the additional cluster initiates one or more other applications in one or more other ones of the clusters that have local access to the one or more remote data resources.

Accordingly, processing operations are performed utilizing the data resources in the corresponding one or more additional clusters in accordance with the one or more additional applications. Each remote data resource identified in a given iteration of step 206 is actually a local data resource in the particular cluster in which the corresponding processing operations are eventually performed. In this embodiment, "all processing" is intended to be broadly construed so as to encompass all cluster-based computations to be performed within the clusters utilizing their respective sets of local data resources.

In step 210, processing results from the first and one or more additional clusters are aggregated and the aggregated processing results are provided to the client that submitted the first application.

The aggregation may be performed in some embodiments by the cluster on which the first application was initiated, which is illustratively YARN cluster 104-1 in the particular example described above. Alternatively, in other embodiments, aggregation can occur incrementally on multiple ones of the clusters.

The processing results from the first and one or more additional clusters advantageously preserve privacy of those clusters in their respective local data resources. For example, the processing results from a given one of the clusters may be permitted to be transmitted to another one of the clusters but the corresponding local data resources of the given cluster that are utilized to obtain the transmitted processing results are not permitted to be transmitted to another one of the clusters.

Similar advantages are provided with regard to other aspects of data protection, including data security.

The particular processing operations and other system functionality described in conjunction with the flow diagram of FIG. 2 are presented by way of illustrative example only, and should not be construed as limiting the scope of the invention in any way. Alternative embodiments can use other types of processing operations for implementing multi-cluster distributed data processing functionality. For example, the ordering of the process steps may be varied in other embodiments, or certain steps may be performed concurrently with one another rather than serially. Also, one or more of the process steps may be repeated periodically for different types of analytics functionality, or multiple instances of the process can be performed in parallel with one another on different WWH platforms or other types of platforms implemented within a given information processing system.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments can provide a number of significant advantages relative to conventional arrangements.

For example, some embodiments provide WWH platforms that are faster and more efficient than conventional analytics systems. Moreover, multi-cluster distributed data processing platforms in some embodiments are implemented in a decentralized and privacy-preserving manner. These and other multi-cluster distributed data processing platforms advantageously overcome disadvantages of conventional practice, which as indicated previously often rely on copying of local data to a centralized site for analysis, leading to privacy and performance concerns.

In some embodiments, a multi-cluster distributed data processing platform is configured to leverage Big Data profiles and associated Big Data analytics in processing local and remote data resources across multiple geographic regions or other types of data zones.

Additional details regarding Big Data profiles and associated Big Data analytics that can be implemented in illustrative embodiments of the present invention are described in U.S. Pat. No. 9,031,992, entitled "Analyzing Big Data," which is commonly assigned herewith and incorporated by reference herein.

A multi-cluster distributed data processing platform in an illustrative embodiment can utilize the data scattered across multiple regional data centers located worldwide, while preserving data privacy and adjusting for differences in data formats and other factors between the various data centers.

A WWH platform in some embodiments leverages one or more frameworks supported by Hadoop YARN, such as MapReduce, Spark, Hive, MPI and numerous others, to support distributed computations while also minimizing data movement, adhering to bandwidth constraints in terms of speed, capacity and cost, and satisfying security policies as well as policies relating to governance, risk management and compliance.

Figure 3A:
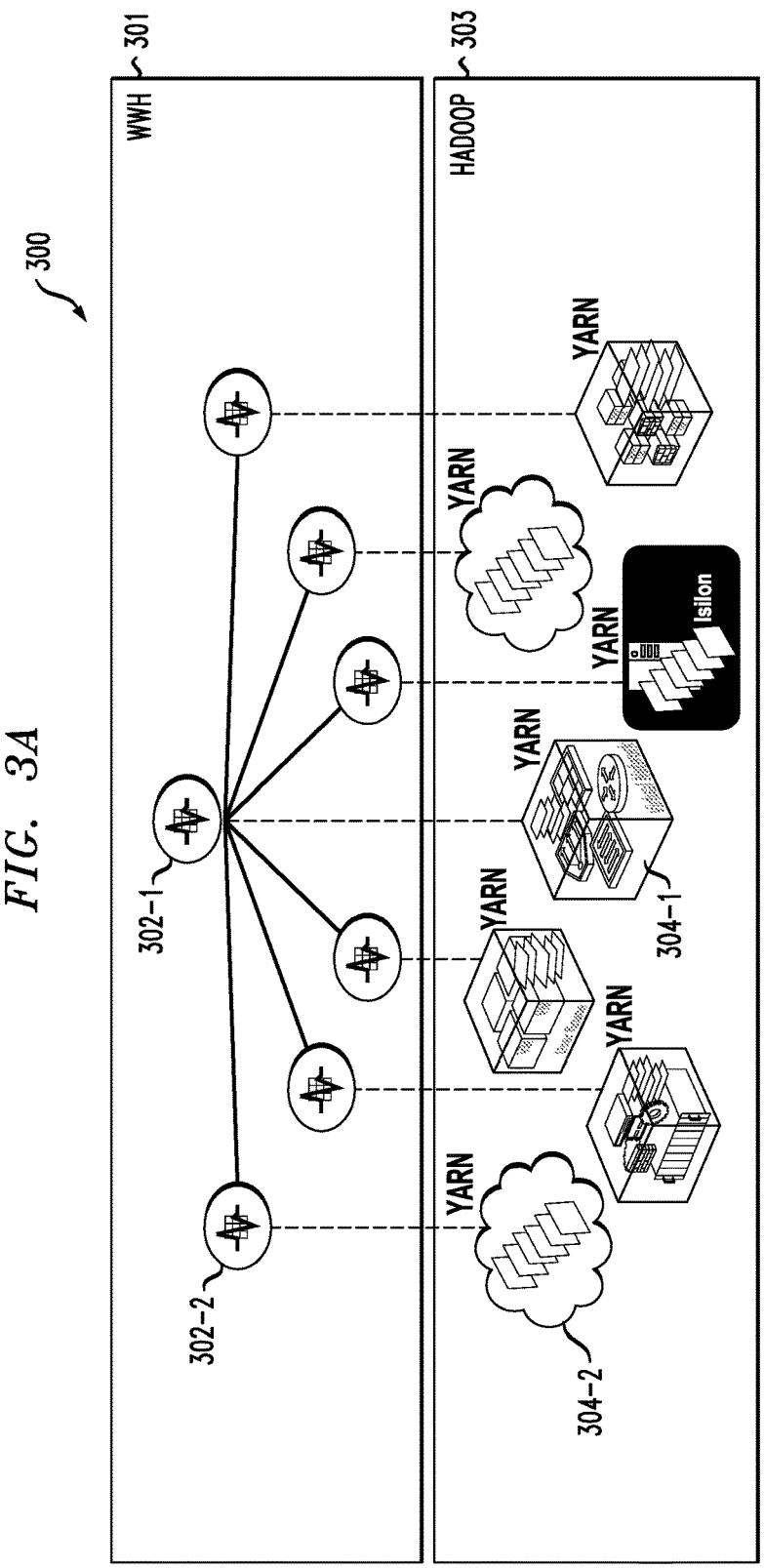
FIGS. 3A and 3B show relationships between WWH nodes and associated Hadoop YARN clusters in another illustrative embodiment. These two figures are collectively referred to herein as FIG. 3.
Figure 3B:
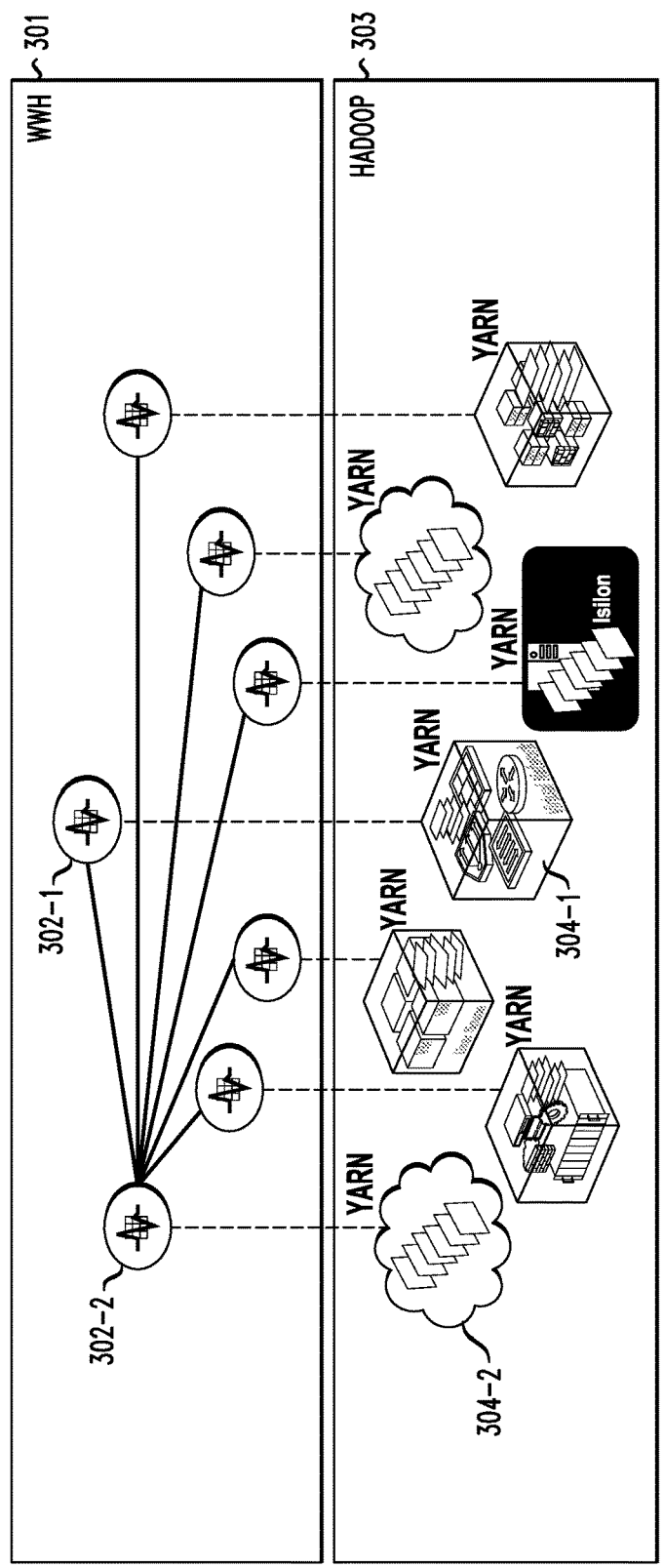

FIGS. 3A and 3B illustrate another information processing system 300 comprising a WWH platform. The WWH platform in this embodiment comprises a WWH node layer 301 that includes multiple WWH nodes 302 such as WWH nodes 302-1 and 302-2. The WWH platform further comprises a YARN cluster layer 303 that includes multiple YARN clusters 304 such as YARN cluster 304-1 and YARN cluster 304-2. The WWH nodes 302 are associated with respective ones of the YARN clusters 304.

The YARN clusters 304 are examples of what are more generally referred to herein as "distributed processing node clusters." Thus, like the YARN clusters 104 of the FIG. 1 embodiment, each of the YARN clusters 304 is assumed to include a cluster of multiple computers or other processing devices. Other types of distributed processing node clusters can be used in other embodiments. The use of Hadoop YARN in the FIG. 3 embodiment is by way of example only, and other embodiments need not utilize Hadoop YARN.

Also, although single layers 301 and 303 of respective sets of WWH nodes 302 and YARN clusters 304 are shown in this figure, other embodiments can include multiple layers of WWH nodes, multiple layers of YARN clusters, or both multiple layers of WWH nodes and multiple layers of YARN clusters.

In the information processing system 300, there is a one-to-one correspondence between the WWH nodes 302 and the respective YARN clusters 304, although this is also by way of illustrative example only. In other embodiments, a given WWH node may be associated with multiple YARN clusters. Additionally or alternatively, a given YARN cluster can be associated with multiple WWH nodes.

It is also possible that one or more of the WWH nodes 302 may each comprise a data processing node of the corresponding YARN cluster 304. Thus, in some embodiments, the separate layers 301 and 303 of the FIG. 3 embodiment are merged into a single layer of YARN clusters one or more of which each include one or more WWH nodes. Such an arrangement is considered yet another illustrative example of a WWH platform, or more generally a multi-cluster distributed data processing platform, as those terms are broadly utilized herein.

The YARN clusters 304 in the FIG. 3 embodiment are assumed to be associated with respective distinct data zones. Each of the YARN clusters 304 is configured to perform processing operations utilizing local data resources locally accessible within its corresponding data zone. The YARN clusters as illustrated in the figure illustratively comprise respective processing platforms including various arrangements of multi-node clouds, virtual infrastructure components such as virtual machines (VMs) and virtual networks, Isilon® platform nodes, and other example arrangements of distributed processing nodes.

By way of example, at least a subset of the YARN clusters 304 may comprise respective geographically-distributed regional data centers each configured to perform analytics processing utilizing the locally accessible data resources of its corresponding data zone. Additional or alternative types of boundaries may be used to separate the system 300 into multiple data zones. Accordingly, geographical distribution of the data zones and their respective clusters is not required.

The WWH nodes 302 illustratively utilize processing results from one or more of the YARN clusters 304 in orchestrating distributed applications over multiple YARN clusters in the system 300. This is achieved in a manner that preserves the privacy of those clusters in their respective local data resources. For example, processing results from a given one of the clusters may be permitted to be transmitted to another one of the clusters while the local data resources of the given cluster that are utilized to obtain the processing results are not permitted to be transmitted to another one of the clusters.

As illustrated in FIG. 3A, the WWH layer 301 may be viewed as comprising an "analytics layer" of the system. The YARN clusters 304 can be interconnected in different ways at that layer through use of different connections between the WWH nodes 302. In this particular figure, a first WWH node 302-1 is shown as being interconnected with each of the other WWH nodes 302 of the WWH layer 301.

FIG. 3B illustrates that alternative interconnections of the WWH nodes 302 are possible, including the arrangement shown in which another WWH node 302-2 initiates connections with each of the other WWH nodes 302 in orchestrating a given distributed application over multiple ones of the YARN clusters 304. It is to be appreciated that, in the FIG. 3 embodiment, any of the WWH nodes 302 can initiate a distributed application on its corresponding one of the YARN clusters 304 and that distributed application can subsequently initiate multiple additional applications involving respective additional ones of the clusters.

Again, the particular arrangements of layers, nodes and clusters shown in FIG. 3 are presented by way of example only, and should not be construed as limiting in any way.

The WWH platform in the FIG. 3 embodiment and one or more other embodiments disclosed herein illustratively adheres to local processing within each cluster using data locally accessible to that cluster. This is achieved without the need for implementing a distributed file system over the multiple clusters. Also, movement of data resources between clusters is avoided. Instead, data resources are processed locally within their respective YARN clusters.

This orchestration of distributed applications over multiple YARN clusters is facilitated in illustrative embodiments through the use of what is referred to herein as a WWH catalog. The WWH catalog is a catalog of data resources, and is an example of what is more generally referred to herein as a "distributed catalog service."

In some embodiments, each cluster that is part of the WWH platform has access to or otherwise comprises an instance of the WWH catalog implemented for that cluster. The WWH catalog instance implemented for a given cluster illustratively contains detailed information regarding local data resources of that cluster, such as, for example, file names and metadata about the files and their content, and references to one or more other clusters in the case of a non-local resource. This creates a hierarchical structure to execution of a WWH application within the WWH platform.

It should be noted that each YARN cluster need not include its own instance of the WWH catalog. For example, in some embodiments, only a subset of the YARN clusters of a multi-cluster distributed data processing platform implement respective instances of a distributed WWH catalog. In such an arrangement, YARN clusters that do not include respective WWH catalog instances can nonetheless participate in performance of computations associated with a distributed WWH application.

A WWH application identifies data files and other input data items from among the various data resources characterized by the WWH catalog. A given such input data item can more particularly comprise, for example, a text file, an XML file, a result relation of a database query or a result of an API query.

Data resources characterized by the WWH catalog can be considered global in the sense that clients are oblivious to the particular location of the resource. For example, a given resource can be comprised of several other resources, each residing in a different data zone. A meta-resource is a piece of data that describes a corresponding data resource. It generally includes the location of the resource and information about how to access the resource.

The WWH catalog is distributed over the clusters of the WWH platform with each of the clusters having visibility of only its corresponding instance of the WWH catalog. In some embodiments, the distributed instances of the WWH catalog are implemented as respective YARN applications running on respective ones of the YARN clusters of the WWH platform.

A given instance of the WWH catalog on a corresponding one of the YARN clusters typically comprises a plurality of entries with each such entry comprising a meta-resource including information characterizing location and accessibility of a corresponding one of the data resources. By way of example, the meta-resource for a given local data resource may comprise a file path to a storage location of that local data resource in the corresponding YARN cluster. Also by way of example, the meta-resource for a given remote data resource may comprise information identifying another cluster for which that data resource is a local data resource.

A given meta-resource of the WWH catalog may additionally or alternatively comprise one or more other types of information, such as, for example, information regarding transformation of the data resource into one or more designated formats, access control information, policy rules, etc.

The WWH catalog therefore illustratively provides a catalog of entries, each comprising a meta-resource. Each meta-resource describes the respective resource and may contain the code or an API required to transform the resource to the format required by the application. End users or other types of clients may browse the WWH catalog via a browsing API or other type of browsing interface in order to obtain information about meta-resources, and WWH applications may query it for information about how to access the data. As noted above, the WWH catalog is assumed to be distributed across multiple data zones and their respective YARN clusters. Such a distributed arrangement helps to provide security and privacy for the underlying data resources.

Although distributed implementations of the WWH catalog are advantageous in some embodiments, it is possible in other embodiments for the WWH catalog to be implemented in only a single cluster of a WWH platform. Other alternative implementations may include distributed implementations in which the WWH catalog is distributed over only a subset of the clusters of a WWH platform, rather than over all of the clusters of the WWH platform.

The WWH platform and its associated WWH catalog in illustrative embodiments implement a recursiveness property that allows a given distributed application initiated on one of the YARN clusters to initiate additional applications on respective additional ones of the YARN clusters. Those additional applications can similarly initiate more applications on other ones of the YARN clusters different than the YARN clusters on which the additional applications were initiated. In this manner, a distributed application can be executed utilizing local data resources of multiple YARN clusters while preserving the privacy of each of the YARN clusters in its local data resources.

In some embodiments, security measures are deployed that prevent the data zones from being accessible to the outside world. For example, firewalls, routers and gateways may prevent public access to a cluster of a given data zone, allowing access to the cluster only from within a certain access point. The WWH platform in illustrative embodiments is configured to allow such "hidden" data zones to take part in both sharing data and computation.

The execution of a WWH application can be represented in some embodiments as a tree or a directed graph. In such an arrangement, each data zone participating in the execution of the application may be viewed as having two roles: (1) it receives a request to execute an application from a client, and (2) it can send requests for execution to other data zones, acting like a client. Role (1) can be represented as a "parent" node in the graph, and role (2) can be represented as an edge from a parent node to one or more "child" nodes. Each data zone may therefore be represented as the parent node of one or more child nodes, but may also be represented as the child node of another parent node representative of another data zone. A given parent node may not have access to data resources needed by a given application, but one or more of its associated child nodes may have access to those resources. The structure of the tree or directed graph representative of a given WWH application can be made visible with appropriate permissions via the distributed WWH catalog.

A WWH platform configured to run applications across multiple clusters associated with respective distinct data zones is advantageous in terms of both privacy and performance. Privacy is provided in that an application submitted to an initial cluster corresponding to a specific data zone accesses the data local to that data zone. The results of the application execution in the initial cluster may be transferred to other clusters corresponding to respective other data zones, but such processing results are typically aggregated and therefore need not include any private information. Furthermore, the recursiveness property mentioned above can in some embodiments be configured so as to hide even the knowledge of which of the clusters participate in the application execution. For similar reasons, performance is greatly improved. Usually raw data stays in its original location and only the results which are of much smaller size may be transferred between clusters. This contributes to improved performance both because of the inherent parallelism and the reduced data transfer between clusters.

As is apparent from the above, the overall privacy and efficiency of the WWH platform is maintained in some embodiments by adhering to local processing within clusters and their associated data zones. In order to keep the processing local, the WWH catalog includes meta-resources that direct the computation to the cluster where the data is stored, such that the computation moves and the data does not.

The WWH platform in illustrative embodiments provides significant advantages relative to conventional systems. For example, the WWH platform in some embodiments is oblivious to the particular local file systems utilized in the respective YARN clusters. Moreover, the WWH platform keeps local raw data private within each of the clusters, does not need a centralized controller or scheduler, and is not limited to use with only the MapReduce framework but is more generally suitable for use with any of a wide variety of frameworks that are supported by YARN.

The WWH platform utilizes a distributed WWH catalog having instances accessible to respective ones of the YARN clusters, and is thus agnostic to where exactly the data resides, and its exact format, and does not require a global file system.

The WWH platform is strongly privacy aware. It supports and encourages local processing of local data and provides simple ways for sending intermediate processing results which do not contain private information between clusters.

The WWH platform provides similar advantages for other aspects of Governance, Risk and Compliance (GRC). For example, by pushing processing closer to where the data is located, the WWH platform facilitates enforcement of policies relating to governance, management of risk, and compliance with regulatory requirements, all at the local level.

The WWH platform supports multiple data zones. A data zone is illustratively a distinct YARN cluster with its own local data. Such a data zone will usually execute a YARN application such as a MapReduce application on its local data. The WWH platform provides a framework which spans across multiple data zones, and enables the combination of processing results based on local data resources of the respective data zones in a global manner. Thus, the WWH platform provides and encourages cooperation between different data zones. However, the WWH platform does not encourage moving raw data between data zones, for both performance and privacy reasons, as well as for other related reasons such as the above-noted facilitation of GRC at the local level.

The WWH platform in some embodiments has an open architecture in the sense that any YARN cluster can join the WWH platform, and therefore the WWH platform in such an embodiment does not require any single centralized controller. Every participating YARN cluster is in control of the data it wishes to share with the outside world. An authorized external client can connect to any data zone supported by the WWH platform and there is no single entry point.

The WWH platform can be illustratively implemented utilizing YARN applications. For example, when a client wishes to run a WWH application it contacts a first one of the clusters, and runs a YARN application on that cluster. When other clusters need to be contacted, one or more containers of the first cluster act like respective clients for the other clusters, and run YARN applications on those other clusters. Thus in each individual cluster the distributed WWH application is seen as an individual YARN application and YARN itself is not aware of the multiple data zone aspects of the WWH application or the WWH platform.

Like YARN itself, the WWH platform in some embodiments is functionally separated into a platform layer and a framework layer. The WWH framework layer can be configured to support WWH frameworks for executing WWH applications that utilize any of a wide variety of underlying YARN frameworks. A developer can write WWH frameworks, and clients will be able to use those WWH frameworks, in a manner similar to how YARN frameworks such as MapReduce or Spark are utilized on single clusters. For example, some embodiments of WWH platforms described herein are provided with a WWH framework for running MapReduce applications in different data zones associated with respective multiple YARN clusters and using a global reducer in a particular YARN cluster to compute the final results. Alternatively, the global reducer can be implemented at least in part outside of the YARN clusters, such as within a given one of the WWH nodes.

Additional details regarding WWH platforms that can be used in the FIG. 1 embodiment and other embodiments of the present invention are disclosed in U.S. patent application Ser. No. 14/982,341, filed Dec. 29, 2015, now U.S. Pat. No. 10,015,106 and entitled "Multi-Cluster Distributed Data Processing Platform," and U.S. patent application Ser. No. 14/982,351, filed Dec. 29, 2015, now U.S. Pat. No. 10,270,707 and entitled "Distributed Catalog Service for Multi-Cluster Data Processing Platform," both of which are incorporated by reference herein.

As a more particular example of a WWH application that can utilize the above-described WWH framework, consider an information processing system comprising multiple data centers located at different sites around the world, with the data centers maintaining respective large local document repositories. Data analysts wish to perform analytics in the form of a simple word count on the documents on all the sites. However, in performing this analysis, data centers cannot transmit complete documents to one another, but only the results of their respective local word counts. This restriction can be the result of a privacy issue (e.g., the data centers do not wish to expose their documents to the public), network bandwidth (e.g., the data is simply too large), or both.

A WWH application for performing a global word count in the above-described system can be configured as follows. First, a local word-count will be performed on each of the YARN clusters utilizing a local MapReduce framework. Then, the results of the local MapReduce processing are transmitted to a single one of the clusters, and a global reducing task is performed on the processing results in that single cluster. This last operation is illustratively performed by the previously-described global reducer which is part of a WWH-MapReduce-GlobalReduce framework. In other embodiments, alternative aggregation techniques can be used in place of the global reducer at a single cluster. For example, processing results can be aggregated incrementally using multiple ones of the clusters.

A wide variety of other types of analytics processing can be implemented using WWH platforms as disclosed herein.

As another example, bioinformatics applications for metagenomics-based biological surveillance can utilize the WWH-MapReduce-GlobalReduce framework. In one such arrangement, an initial cluster accepts sample genomes which are sent to a plurality of other clusters. Each of the clusters uses a local MapReduce process to compare the samples with private genomic information locally accessible in the corresponding cluster. The results of this local comparison in each cluster are in the form of one or more vectors which are sent back to the initial cluster. The initial cluster then runs a global reducer on the received vectors creating aggregated processing results in the form of a results matrix. This results matrix may be sent to the client for further analysis in order to detect the particular sample causing the problem.

In some embodiments configured to implement bioinformatics applications of the type described above, reads of local biological samples obtained from metagenomics sequencing are subject to mapping operations in each of the clusters. For example, one or more reads of a given biological sample may be subject to mapping based on string resemblance to target genomic sequences. Such a mapping arrangement is illustratively used to generate a hit abundance score vector for the given biological sample. Multiple such hit abundance score vectors generated for different biological samples are combined into a hit abundance score matrix that is utilized in characterizing a disease, infection or contamination, or otherwise providing analytics functionality within the system.

Yet another example is a cooperative security anomaly detection application which uses accumulating evidence to improve the quality of local detectors. Each local detector is run on a single YARN cluster of a multi-cluster WWH platform, and uses its own detecting algorithm implemented as a local MapReduce application using its own private data. The aggregated results of the detection are sent back to the initial cluster using aggregated non-private features only. The initial cluster executes a global reducer to select a set of the best global features and these are sent back to the local detectors of the respective clusters. This process continues for several iterations, with each iteration comprising a new global map-reduce application instance, until it converges. The process considerably improves local detector accuracy using the detection results received from the other clusters.

An arrangement of this type can be implemented in a system for malware detection that operates by analyzing Big Data comprising Domain Name Service (DNS) transactions associated with the web site of a large company. Clearly, such a company will be reluctant to share its transactions logs with other businesses. However, the company may well be willing to share anonymized statistical data in order to defeat a malware threat. By sharing statistical data of multiple sites in the manner described above, an improved malware detector can be constructed. Such a shared detector can use a multi-cluster distributed data processing platform of the type disclosed herein in order to enable the run of the improved detector on data in multiple sites, each using the detector on its own transaction logs and improving the probability of malware detection. No sharing of data and no common file system is needed or used. Other embodiments can incorporate additional functionality for access control, progress monitoring and support of a pluggable failure handling policy.

These example applications demonstrate the use of the WWH-MapReduce-GlobalReduce framework, and serve to illustrate the flexibility provided by the distributed WWH catalog in terms of locating relevant input data. They also demonstrate the privacy and performance features of WWH platforms.

Again, the use of MapReduce as part of a WWH framework is by way of illustrative example only. Numerous alternative frameworks can be utilized as part of a given WWH framework, including in some embodiments any framework supported by YARN, as well as other frameworks in non-YARN embodiments.

Further examples of illustrative embodiments will now be described with reference to FIGS. 4 through 7. In these illustrative embodiments, distributed data processing platforms are configured to implement functionality for Global Benchmarking and Statistical Analysis at Scale (GBSAS).

Some of these embodiments utilize WWH to provide a mechanism to orchestrate the distribution and parallel execution of computations across multiple data zones, illustratively implemented as respective clusters and/or respective clouds. WWH allows for data residing across these data zones to be analyzed without requiring that all the data be moved to a single location, thereby conserving bandwidth and providing additional advantages such as reduced energy consumption.

Some of these embodiments are configured to perform benchmarking of an entity, be it an enterprise, a device, a human professional, a unit of operation in an assembly line, or anything that possesses a property that can be measured in some way. For example, benchmarking a property of an entity may comprise analyzing, through comparison, a set of standard metrics of that property for that entity against the value of the same set of standard metrics of the same property for similar entities.

More particular examples include the following. An enterprise can be benchmarked by comparing its market cap against the market cap of all other enterprises in the same industry and that are serving approximately the same market segment. A human can have his or her performance benchmarked by comparing the average number of patents published over the last five years against that average for all professionals in the same field and with similar seniority. A device can be benchmarked by comparing its throughput against the throughput of all the devices of the same model, with the same number of years in use, and that are processing similar workloads.

These and a wide variety of other types of statistical analysis performed on potentially large datasets can considerably facilitate understanding of the distribution and behavior of the corresponding data.

It should be noted that terms such as "benchmark" and "benchmarking" as used herein are intended to be broadly construed, and illustratively involve utilization of results of local and global statistical computations to compare or otherwise analyze properties or other parameters of datasets across multiple data zones.

Some embodiments utilize WWH to perform benchmarking and statistical analysis at scale, by comparing entities that may reside in different data zones, scattered across the globe, where the properties of these entities are monitored locally, potentially generating large volumes of data close to their associated sensors, without requiring that all these datasets to be moved to a single location before they can be analyzed.

Such an approach illustratively allows for the parallel and distributed computation of intermediate values required for the global benchmarking to be done close where the data resides, benefiting from the principle of data locality and conserving bandwidth as data movement is not required. The term "intermediate" in this context and other computational contexts herein is intended to be broadly construed as referring to a type of computation that is performed within a given data zone and for which a resulting value is further processed to compute a corresponding global result. For example, such a computation may be intermediate between initiation of a given benchmarking job and performance of a global computation based on results of multiple intermediate computations in respective data zones. A given "benchmarking job" as that term is used herein should be understood to include one or more benchmarking operations that involve generation and utilization of local and global results. Benchmarking operations can therefore illustratively involve processing of local and global results in order to perform comparisons of dataset properties or other parameters across data zones utilizing various types of statistical analysis.

As a more particular example of one possible GBSAS use case, a healthcare entity may wish to perform benchmarking of several performance metrics associated with the usage of particular types of medical equipment. More specifically, such a use case can be targeted at comparing the average duration of a medical examination, such as magnetic resonance imaging (MRI) or a computed axial tomography (CAT) scan of a particular set of organs, in one hospital, with the average duration of the same examination on the same set of organs, in all the hospitals across the world. In this scenario, the data for each hospital is sent and stored in an instance of a cloud that is physically located in proximity to the hospital, abiding to a series of GRC restrictions that the hospitals have imposed on the location, security and privacy of the cloud, in order for them to actually be able to send the data there.

Figure 4:
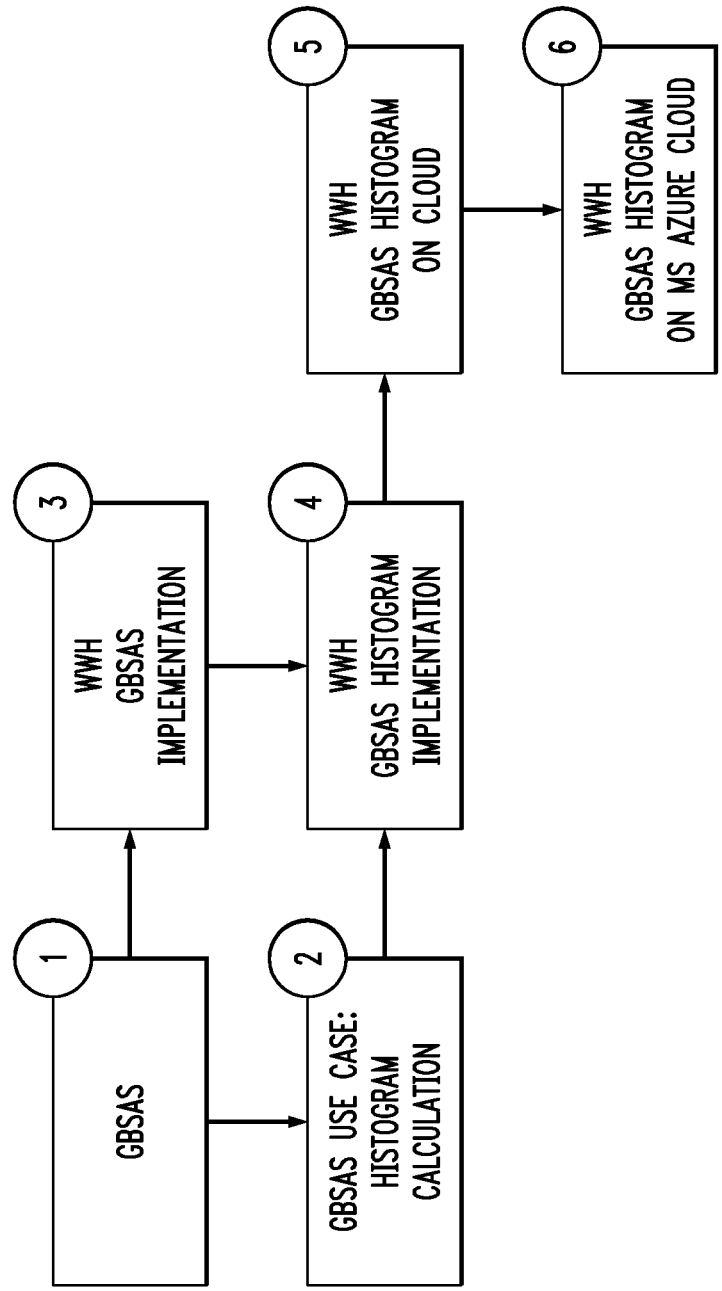
FIG. 4 illustrates different aspects of illustrative embodiments relating to Global Benchmarking and Statistical Analysis at Scale (GBSAS).

With reference initially to FIG. 4, different aspects of illustrative embodiments relating to GBSAS include the following:

1. A methodology for GBSAS.
2. A GBSAS Use Case: Histogram Calculation.
3. WWH implementation of the GBSAS methodology.
4. WWH design and implementation of the GBSAS histogram.
5. WWH implementation of GBSAS histogram on a Cloud environment.
6. WWH implementation of GBSAS histogram on Microsoft (MS) Azure Cloud.

Each of these aspects of illustrative embodiments implementing GBSAS functionality will be described in more detail below. These aspects are examples only, and can be varied in other embodiments to accommodate other use cases and associated arrangements of distributed processing nodes.

GBSAS Methodology

GBSAS in these embodiments can be viewed as a scale-out methodology and approach to perform benchmarking where several datasets participate in the benchmarking, and where no limits or constraints are imposed on the scalability of the benchmarking relative to the number of datasets participating, relative to the size of the datasets included, or relative to the physical location of the datasets per se. For example, some of the datasets can be co-located within a given computing cluster or within an instance of a cloud, or be located across several locations on different continents.

A GBSAS computation illustratively comprises at least two computation units:

1. Intermediate Calculation: to be performed in a distributed manner, on each dataset; and
2. Global Calculation: to be performed in one location, after the results of the intermediate calculations have been received.

For resilience, for performance gain, or for any other reason, the Global Calculation may be performed in several locations at the same time, and the user may be exposed to the results of the first Global Calculation that becomes available. The location where a Global Calculation is performed is typically the location where the GBSAS was initiated, but not necessarily that location. In some embodiments, the location that starts the GBSAS will be referred to as the initiating node and the location where the global calculation is performed will be referred to as the global calculating node. For simplicity, in some of the examples below, the initiating node and the global calculating node are assumed to be the same node.

It is important to note that a more complex GBSAS implementation may comprise several iterations of Intermediate and Global Calculations, where at each iteration the initiating node may share results of the previous iteration with the virtual nodes in a virtual computing cluster, by passing these values as parameters to the next Intermediate Calculation.

In order for a dataset to participate in a global benchmarking operation, GBSAS implementations may in some cases require that there be a particular computing node affiliated to the dataset. The computing node is also referred to herein simply as a node or an affiliated node, and may be viewed as an example of what is more generally denoted herein as a "distributed processing node." The computing node is further assumed to have enough computational power available to perform the Intermediate Calculation of the dataset within a certain time limit, to have access to the dataset in an efficient and privacy preserving manner, and to be located in close geographical proximity to the dataset so as to benefit from the principle of data locality while performing the Intermediate Calculation.

Specific deployments of GBSAS embodiments may be configured to impose additional constraints on the computing nodes for specific datasets, including by way of example minimum number of computing cores available, minimum bandwidth requirements to communicate the results of the computation back to the initiating node, and minimum throughput requirements for accessing the data.

The GBSAS methodology in some embodiments does not require that each dataset has a different affiliated computing node. The same computing node can execute the Intermediate Calculation of one or more datasets, as long as it has enough computation power to perform all of them in parallel or within a reasonable time frame, and can comply to all the requirements imposed by GBSAS in general, and by the specific GBSAS deployment.

The GBSAS methodology in some embodiments comprises dividing a calculation associated with a benchmarking operation involving statistical analysis, into a series of iterations, where each iteration illustratively comprises:

1. Computation of an Intermediate Calculation for each one of the datasets participating in the benchmarking operation, where the computation for each dataset is performed at its affiliated computing node.

2. Each computing node sends the results of the Intermediate Calculation for each one of its affiliated datasets to the global calculating node or nodes, which will typically include at least the initiating node.

3. Computation of the Global Calculation at the global calculating node or nodes, after receiving the results of the Intermediate Calculations for all datasets participating in the benchmarking operation.

The GBSAS methodology is illustratively configured to:

1. Minimize movement of the datasets per se, allowing for computations to be performed close to where the datasets reside.

2. Preserve data privacy, as the datasets are not shared or made visible to the other nodes, including the initiating nodes and the global calculating nodes.

3. Minimize data sharing as only the results of the Intermediate Calculations are sent and shared by the participating nodes.

The GBSAS methodology in some embodiments transforms a calculation that would typically be done against all the values in a single dataset, into a set of two calculations, where the Intermediate Calculations are performed locally on each dataset, the results are shared with the designated global calculating node or nodes, and the global calculating node or nodes then perform the Global Calculation.

GBSAS for Global Average

Consider, for example, a GBSAS implementation configured to calculate the global average age of all individuals present on a set of datasets, $D_n=\{d_1, d_2, \ldots, d_n\}$, where each dataset $d_i$ contains a list of ages for a set of individuals. Similarly, the datasets could contain the time it took for a certain procedure to be performed on a patient, or the average number of miles/gallon for all cars of a given brand within a given location, or the delivery time for packages delivered by a delivery company, or any other numerical value for which the calculation of an average has some relevance.

In this example, one possible implementation of the intermediate and global calculations is as follows:

1. Intermediate Calculation for Global Average:
   (a) Calculate the sum of all values present in a dataset, referred to as $Sum_i$;
   (b) Count the number of items summed in a dataset, referred to as $Count_i$; and
   (c) Return a value pair with these results, referred to as $ValPair_i=<Sum_i, Count_i>$.

2. Global Calculation for Global Average:
   (a) Receive the value pairs for all the datasets and create a set of value pairs, referred to as $ValPairSet_n=\{ValPair_1, ValPair_2, \ldots, ValPair_n\}$, which can be also represented by $ValPairSet_n=\{<Sum_1, Count_1>, <Sum_2, Count_2>, \ldots, <Sum_n, Count_n>\}$;
   (b) Calculate the sum of the sums and the sum of the counts, creating another value pair, referred to as $ValPair_g=<\Sigma_{i=1}^{i=n} Sum_i, \Sigma_{i=1}^{i=n} Count_i>=<Sum_g, Count_g>$; and
   (c) Calculate the global average by dividing the sum of the sum by the sum of the counts, represented as: $Average_{global}=Sum_g/Count_g$.

GBSAS for Minimum and Maximum

As another example, consider a GBSAS implementation configured to calculate the global minimum and the global maximum value of all values present on a set of datasets, $D_n=\{d_1, d_2, \ldots, d_n\}$, where each dataset $d_i$ contains a list of values being measured by sensors. This dataset could more generally be a set of any values representing any measure for which the calculation of a minimum or a maximum has some relevance.

In this example, one possible implementation of the intermediate and global calculations is as follows:

1. Intermediate Calculation for Minimum and Maximum values:
   (a) Calculate the minimum and the maximum of all values present in a dataset, referred to as $Min_i$ and $Max_i$; and
   (b) Return a value pair with these results, referred to as $ValPair_i=<Min_i, Max_i>$.

2. Global Calculation for Minimum and Maximum values:
   (a) Receive the value pairs for all the datasets and create a set of value pairs, referred to as $ValPairSet_n=\{ValPair_1, ValPair_2, \ldots, ValPair_n\}$, which can be also represented by $ValPairSet_n=\{<Min_1, Max_1>, <Min_2, Max_2>, \ldots, <Min_n, Max_n>\}$; and
   (b) Calculate the minimum of the minimums and the maximum of the maximums, creating another value pair, referred to as $$ValPair_g = <\min_{i=1\,to\,n} Min_i, \max_{i=1\,to\,n} Max_i> = <Min_g, Max_g>.$$

GBSAS for a Set of Minimum and Maximum Values

It is important to note that, in a very large dataset, it is often useful to actually have not only the minimum and the maximum values, but to actually have visibility to the set of m minimum values and m maximum values. This is typically because there may be a severe distance between the set of lowest values in a set and the set of highest values in a set.

In this example, one possible implementation of the intermediate and global calculations is as follows:

1. Intermediate Calculation for the m Minimum and m Maximum Values:
 (a) Calculate the set of m minimum and the set of m maximum of all values present in a dataset $d_i$, referred to as $MinSet_i^m$ and $MaxSet_i^m$. These sets can be also represented as a sorted list in increasing order, where:

$$MinSet_i^m = <Min_i^1, Min_i^2, \ldots Min_i^m>, \text{ where } Min_i^k \leq Min_i^j, \forall k < j.$$

$$MaxSet_i^m = <Max_i^1, Max_i^2, \ldots Max_i^m>, \text{ where } Max_i^k \leq Max_i^j, \forall k < j.$$

(b) Return a value pair with these results, referred to as $ValPairSets_i^m = <MinSet_i^m, MaxSet_i^m>$.

2. Global Calculation for the m Minimum and the m Maximum Values:
 (a) Receive the value pairs for all the datasets and create a set of value pairs, referred to as $ValPairSets_n^m = \{ValPairSets_1^m, ValPairSets_2^m, \ldots, ValPairSets_n^m\}$, which can be also represented by $$ValPairSets_n^m = \begin{Bmatrix} \langle MinSet_1^m, MaxSet_1^m \rangle, \\ \langle MinSet_2^m, MaxSet_2^m \rangle, \\ \ldots, \\ \langle MinSet_n^m, MaxSet_n^m \rangle \end{Bmatrix}$$

(b) Calculate the set of minimums of the minimums and the set of maximums of the maximums, creating another value pair, referred to as:

$$ValPairSets_g^m = \begin{Bmatrix} MinSet_g^m, \\ MaxSet_g^m \end{Bmatrix}$$

$$ValPairSets_g^m = \begin{Bmatrix} \langle Min_g^1, Min_g^2, \ldots, Min_g^m \rangle, \\ \langle Max_g^1, Max_g^2, \ldots, Max_g^m \rangle \end{Bmatrix}, \text{ where}$$

$$MinAllSet_g^{m \times n} = \bigcup_{k=1}^{n} MinSet_i^m$$

$$MaxAllSet_g^{m \times n} = \bigcup_{k=1}^{n} MaxSet_i^m$$

$MinSet_g^m$ = minimum m values in $MinAllSet_g^{m \times n}$, sorted in increasing order; and
$MaxSet_g^m$ = maximum m values in $MaxAllSet_g^{m \times n}$, sorted in increasing order.

GBSAS for Standard Deviation

As a further example, a GBSAS implementation can be configured to calculate the standard deviation of all values present on a set of datasets, $D_n = \{d_1, d_2, \ldots d_n\}$, where each dataset $d_i$ contains a list of values representing salaries. This dataset could more generally comprise a set of any values representing any measure at all for which the calculation of a standard deviation has some relevance.

In this example, the calculation may comprise a series of iterations of local and global calculations. A potential implementation of the iterations and their respective intermediate and global calculations could be as follows:

Iteration 1: Calculation of Global Average $Average_{global}$ as above

Iteration 2: Calculation of Global Standard Deviation

1. Intermediate Calculation for a dataset $d_i$:
 (a) Receive as a parameter the value of the global average $Average_{global}$ calculated in the previous iteration;
 (b) Calculate the $ValuePair_i$ containing the sum of the differences $SumDiff_i$ and the number of items in the dataset $d_i$ referred to as $NumberItems_i$. The value pair $ValuePair_i$ can be represented as $$ValPair_i = <SumDiff_i, NumberItems_i>,$$

where $SumDiff_i = \sum_{j=1}^{|d_i|} (Average_{global} - v_j^i)^2$

2. Global Calculation:
 (a) Receive the value pairs for all the datasets and create a set of value pairs, referred to as $ValPairSet_n = \{ValPair_1, ValPair_2, \ldots, ValPair_n\}$, which can be also represented by $$ValPairSet_n = \begin{Bmatrix} \langle SumDiff_1, NumberItems_1 \rangle, \\ \langle SumDiff_2, NumberItems_2 \rangle, \\ \ldots, \\ \langle SumDiff_n, NumberItems_n \rangle \end{Bmatrix}$$

(b) Calculate the $ValuePair_{ii}$ which comprises the sum of the sum of differences squared $SumDiff_{total}$ and the total number of items $NumberItems_{total}$, referred to as $$ValuePair_n = <SumDiff_{total}, NumberItems_{total}>$$

$$ValuePair_n = <\Sigma_{i=1}^{n} SumDiff_i, \Sigma_{i=1}^{n} NumberItems_i>$$

(c) Calculate the standard deviation StdDev by dividing both values and calculating the square root, represented as $$StdDev = \sqrt[2]{SumDiff_{total} / NumberItems_{total}}$$

GBSAS Use Case: Histogram Calculation

This section describes how GBSAS can be used for the calculation of a Global Histogram, in several different ways.

A histogram for a set of discrete values is illustratively a graph where the x-axis is divided into non-overlapping, consecutive intervals, also referred to as slices or bands. In general, the slices are of the same size with the exception of the first and the last slices in the graph, where the first slice represents the interval between the value zero and a minimal value, referred to as minValue; and the last slice represents the interval between a maximum value, referred to as maxValue, and infinite. The y-axis represents the number of items in the set whose value falls within a given band.

The design of a histogram typically includes the definition of the following parameters: the minimum value, minValue; the maximum value, maxValue; and the number of slices, numberSlices, which will then determine the size of each one of the slices. In this scenario, the number of slices is constant just for simplicity and, as a result, the size of the slices, referred to as sizeSlice, can be calculated as follows:

sizeSlice=(maxValue−minValue)/numberSlices.

GBSAS Use Case: Histogram with Known Interval Range

Using the GBSAS approach, a global benchmarking operation to calculate a histogram can be defined as follows, given that there is a reasonable knowledge around the values for minValue and for maxValue.

In this example, a global histogram is created at scale, given a set of datasets, $D_n=\{d_1, d_2, \ldots d_n\}$, where each dataset $d_i$ contains a list of values $V_{m=|d_i|}{}^i=\{v_1{}^i, v_2{}^i, \ldots, v_m{}^i\}$.

The following parameters are defined: minValue; maxValue; and s=numberSlices.

Let numberItems$_k=\Sigma_{i=1}{}^n$Count$_i=\Sigma_{j=1}{}^{m=|d_i|}$if $v_j{}^i$ falls in slice$_k$, then 1 else 0

A list of key value pairs, referred to as histPairList, is calculated where $$histPairList = \begin{Bmatrix} \langle slice_1, numberItems_1 \rangle, \\ \langle slice_2, numberItems_2 \rangle, \\ \ldots, \\ \langle slice_s, numberItems_s \rangle \end{Bmatrix}$$

Using the histPairList, plot a histogram, where:
The x-axis is divided into numberSlices
The y-axis for slice$_i$, represents numberItems$_i$, defining the height of the bar for slice$_i$.

The GBSAS implementation in this example is configured to orchestrate the distributed calculation of histPairList for each dataset $d_i \in D_n$, then merge all histPairList into a histPairList, and use it to plot the global histogram.

More formally, for each dataset $d_i \in D_n$, the computing node affiliated to the dataset will receive the following parameters: minValue; maxValue; and s=numberSlices. For each dataset $d_i \in D_n$, the node affiliated to the dataset will calculate $$histPairList_i = \begin{Bmatrix} \langle slice_1, numberItems_1^j \rangle, \\ \langle slice_2, numberItems_2^j \rangle, \\ \ldots, \\ \langle slice_s, numberItems_s^j \rangle \end{Bmatrix}$$

For each dataset $d_i \in D_n$, the node affiliated to the dataset will share histPairList with the global node.

After receiving histPairList for all i=1 n, the global node will calculate histPairList by merging them as follows:

$$histPairList = \begin{Bmatrix} \left(slice_1, \sum_{i=1}^{n} numberItems_1^j\right), \\ \left(slice_2, \sum_{i=1}^{n} numberItems_2^j\right), \\ \ldots, \\ \left(slice_s, \sum_{i=1}^{n} numberItems_s^j\right) \end{Bmatrix}$$

The histPairList is then plotted.

In other words, applying GBSAS, the Intermediate Calculation and the Global Calculations can be defined as follows:
1. Intermediate Calculation for Histogram Slices:
   (a) Given minValue, maxValue, and s=numberSlices, calculate for the affiliated dataset histPairList$_i$.
2. Global Calculation for Histogram Slices:
   (a) Calculate histPairList by merging histPairList$_i$, for all i=1 n; and
   (b) Plot the histogram represented by histPairList.

GBSAS Use Case: Histogram with Known Interval Range and with Comparison

For the purposes of benchmarking in some embodiments, it may be beneficial to also plot or otherwise show in some way, a specific value or a specific metric calculated in the dataset affiliated with the initiating node, where this dataset is referred to as $d_i$. It is important to note that the user or application that is initiating the global analytics actually has access or permission to look at its own dataset. As a result, it has access or permission to see exactly how a metric of its dataset or a specific value in its dataset fits in the overall histogram. In this particular case, the Global Calculation could include an Intermediate Calculation for Local Placement in the Histogram.

For example, the Global Calculation for the Histogram could be expanded as follows:
1. Intermediate Calculation for Histogram Slices:
   (a) Given minValue, maxValue, and s=numberSlices, calculate for the affiliated dataset histPairList$_i$.
2. Global Calculation for Histogram Slices:
   (a) Calculate histPairList by merging histPairList$_i$, for all i=1 . . . n; and
   (b) Plot the histogram represented by histPairList.
3. Intermediate Calculation for Local Placement, calculated for the affiliated dataset of the initiating node only. When the initiating node is the same as the global calculating node, this is calculated in the initiating node together with the Global Calculation or right after it. When the initiating node is not the same as the global calculating node, this is calculated in the initiating node after the Global Calculation is done or in parallel to it.
   (a) Calculate for my affiliated dataset the set of metrics to be plotted:

$$myLocalPlacement = \begin{Bmatrix} myAverage, \\ myMin, \\ myMax, \\ myStandardDeviation, \\ myHistogram \end{Bmatrix}$$

(b) Plot in the histogram represented by histPairList the values in myLocalPlacement.

GBSAS Use Case: Histogram with Unknown Interval Range

The previous example made the assumption that the values for minValue and for maxValue are well known and understood in advance. This is a typical scenario where one or more of the following conditions apply:
1. The full range of values is known, such as in age of people, where the range goes typically between 0, for newborns, and 120, for the oldest. In this case, minValue can be assigned to as low as 1, and maxValue can be assigned to as high as 100, meaning that after 100 the histogram no longer needs to slice the count any further and the last slice represents all people older than 100 years old.
2. The values are typically evenly distributed across the histogram slices. In this case, one knows that the count for the number of values within each slice will be significantly represented. This is in contrast to a situation where there are 1,000 values, the histogram is divided into 10 slices, and 900 of the values fall in slice 5 and 6, and 100 are sparsely divided along the other 8 slices. There is still value in understanding that there is a concentration of values around slices 5 and 6, but a lot of benchmarking information is lost because little is known relative to where the 900 values are distributed between the slices 5 and 6. An alternative histogram that could deliver more value could be represented as follows: minValue would be the lower bound of slice 5, meaning that the first slice would capture the count of all values that are below slice 5; and maxValue would be the upper bound of slice 6, meaning that the last slice would capture the count of all values that are higher than slice 6. There would be 8 slices between the first and the last, to distribute the 900 values that originally fell into slices 5 and 6, but that could be represented now in a more granular manner, and a better view of how these values are distributed could be obtained.

In order to improve visibility of the data distribution and achieve more information gain, it is important to actually gain more insight into the range and distribution of these values within the range, to have more refined histograms.

In this case, applying GBSAS, the calculation of this histogram can be defined as a set of two iterations, where:

First Iteration: calculates the set of m minimal values and the set of m maximum values for all datasets. The GBSAS implementation for this calculation has been described previously.

Second Iteration: calculates the histogram with known interval range, passing the parameters as defined below. The GBSAS implementations for this calculation using known interval range and known interval range with comparison have been described previously. While either one can be used, the implementation using known interval range with comparison will typically yield an even higher information gain to the data scientist or other user.

Let the following be the results returned by the first iteration and as defined above for the case of GBSAS for a set of minimum and maximum values:

$$ValPairSets_g^m = \begin{Bmatrix} \text{Min}Set_g^m, \\ \text{Max}Set_g^m \end{Bmatrix}$$

$$ValPairSets_g^m = \begin{Bmatrix} \langle \text{Min}_g^1, \text{Min}_g^2, \ldots, \text{Min}_g^m \rangle, \\ \langle \text{Max}_g^1, \text{Max}_g^2, \ldots, \text{Max}_g^m \rangle \end{Bmatrix}, \text{ where}$$

$$\text{min}Value = \max \text{Min}Set_g^m; \text{ and}$$

$$\text{max}Value = \min \text{Max}Set_g^m.$$

It is important to note that there are several ways to calculate minValue and maxValue, as well as to define the value of m, when deciding how many minimal and how many maximum values for each set should be selected.

For example, in this particular implementation, a decision was made to select the maximum minimal value as the lower limit and the minimal maximum value as the upper limit.

Another implementation could be to set minValue and maxValue to the average values of the $\text{MinSet}_g^m$ and $\text{MaxSet}_g^m$ respectively, or any other function on these sets.

A more sophisticated decision may be used, such as implementing the first iteration as a set of iterations themselves, where first it calculates the total number of elements across all datasets and then calculates the value of m as a percentage of the total number of elements, in order to gain a good enough sample of the minimal values in the distributed sets and understand how the minimal and the maximal values actually behave.

Another approach includes using one iteration to calculate the number of elements, the average, and the standard deviation of every dataset and then selecting the minValue and maxValue that best captures the variation of the data. In some scenarios, there may not be a need to evenly distribute the slices, where slices are selected to best fit the data. The first iteration in such an embodiment can be done in a very simple manner, utilizing an evenly distributed histogram, and then more iterations can be added to refine each of the slices from the first iteration that are highly populated so as to provide a zoom-in capability to look into these particular high-density slices.

GBSAS Use Case: Histogram with Unknown Interval Range for Local and Global Comparison View The previous sections illustrate embodiments that calculate the values required to plot a histogram. This section provides an additional illustrative example bringing together many of the aspects described previously to create a histogram that can provide a potentially richer set of information, and it includes several iterations, where each iteration below can include several iterations of its own:

Iteration 1: Histogram with unknown interval range as described above
 1. Plot the histogram represented by histPairList.
 2. Plot in the histogram $$ValPairSets_g^m = \begin{Bmatrix} \text{Min}Set_g^m, \\ \text{Max}Set_g^m \end{Bmatrix}.$$

Iteration 2: Calculate Global Average as described previously
 1. Intermediate Calculation for Some Global Values
   (a) Calculate the Intermediate Calculation for Global Average; and
   (b) Calculate the Intermediate Calculation for Global Standard Deviation.
 2. Global Calculation for Some Global Values
   (a) Calculate the Global Calculation for Global Average;
   (b) Calculate the Global Calculation for Global Standard Deviation; and
   (c) Plot in the histogram all global values obtained.
 3. Intermediate Calculation for Local Placement, as described previously.

GBSAS Use Case: Histogram with Unknown Interval Range for Comparison and Global View, for Complex Datasets In some embodiments, the datasets do not have a simple list of values. For example, they may comprise entries of databases, or they may have unstructured data, or data in any other shape. In such embodiments, the Intermediate Calculation may require that the data be first transformed into a list of data points.

Accordingly, GBSAS implementations of this type may add another parameter to the Intermediate Calculation, which includes extracting, from the original dataset, an intermediate dataset that contains just the list of data points. This parameter can be added to any and all previous examples.

GBSAS Use Case: Histogram with Unknown Interval Range for Comparison and Global View, for Complex Datasets, for Selected Subsets In some embodiments, not all entries in the original dataset should be included in the calculations. In such embodiments, the Intermediate Calculation may require that the data be first examined, and that a temporary dataset be created that contains only the entries that comply to certain constraints.

Accordingly, GBSAS implementations of this type may add another parameter to the Intermediate Calculation that includes a test function that will be applied to the original dataset. The Intermediate Calculation will then first examine all entries in the original dataset and apply the test function, and will extract, from the original dataset, only the entries that comply with constraints expressed in the function. This parameter can be added to any and all previous examples.

It is important to note that, in some cases, datasets may require a combination of examining individual datasets to select only the ones that comply with certain constraints, and extracting from complex datasets only the values required for the computation.

It is also important to note that not all Intermediate Calculations may be done in datasets with single data points. In some cases, the entries can be a key value pair, and only the values in the pairs should be used in the calculation. For example, the key value pair may be considered a complex dataset, and the extraction function will extract the values of the key value pairs, where the key complies with a specified test function.

GBSAS Use Case: Global and Local Histograms

In some embodiments, the locations participating in a GBSAS computation may have permission to have a limited view or even to a total view of the datasets, but due to bandwidth constraints it may be unfeasible to move the data to a single location. In such embodiments, at least portions of the information that the GBSAS implementation calculates locally, and shares with the global calculating node, can actually be displayed and viewed by the user that initiated the calculation.

For example, consider a situation where the user can actually view the histograms of all datasets. In this case, the outcome can include the global histogram as well as the histograms for all the datasets and a display can be generated to illustrate how the requesting node is actually positioned on each one of these histograms.

It is important to note that the foregoing GBSAS use cases and other examples are illustrations of particular GBSAS implementations, and should not be construed as limiting in any way. The particular GBSAS methodologies and approaches in these and other embodiments can be adapted in a straightforward manner for performance of a wide variety of other types of statistical computations in order to collect, analyze and display information characterizing multiple locally-accessible datasets.

WWH for the Implementation of the GBSAS Methodology

As described above, a WWH platform in some illustrative embodiments is advantageously configured to support worldwide scale computations while minimizing data movement, adhering to bandwidth constraints in terms of speed, capacity and cost, and abiding to security and GRC policies.

For example, WWH can provide an abstraction where each data zone is associated with a virtual node within a virtual computing cluster, as will now be described in more detail in conjunction with the illustrative embodiment of FIGS. 5, 6 and 7. These figures illustrate the operation of an example distributed data processing platform utilized to implement GBSAS functionality. Although these particular illustrative embodiments make reference to WWH, YARN and Hadoop, it should be understood that other embodiments do not require use of WWH, YARN or Hadoop, and can more generally be implemented using a plurality of distributed processing nodes associated with respective data zones.

Figure 5:
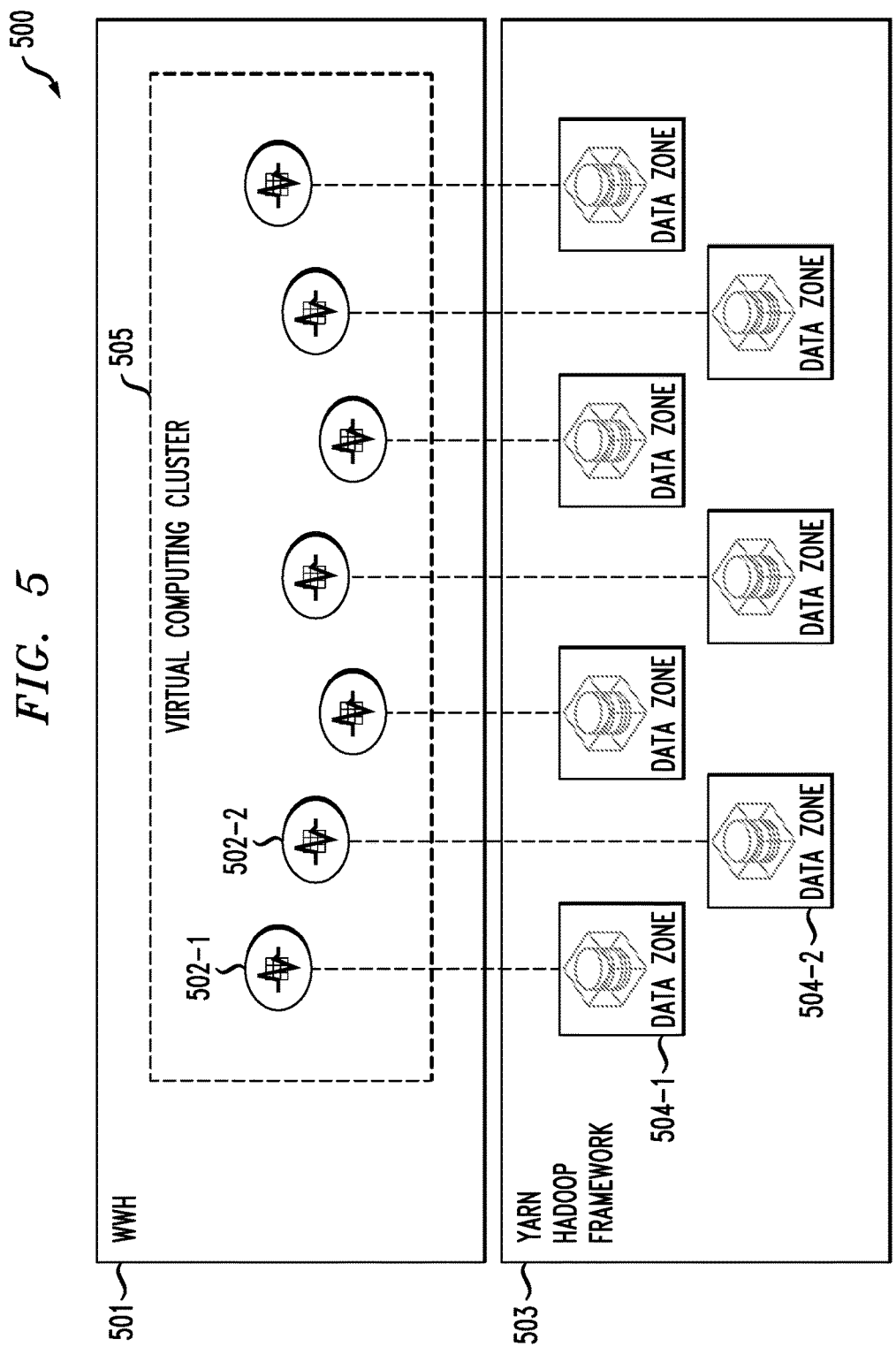
FIGS. 5, 6 and 7 show example operations in a distributed data processing platform utilized to implement GBSAS functionality in an illustrative embodiment.

Referring initially to FIG. 5, an information processing system 500 comprises a WWH platform comprising a WWH node layer 501 that includes multiple WWH nodes 502 such as WWH nodes 502-1 and 502-2. The WWH platform further comprises a YARN cluster layer 503 that includes multiple YARN clusters 504 such as YARN cluster 504-1 and YARN cluster 504-2 implemented in respective data zones. The WWH nodes 502 are associated with respective ones of the YARN clusters 504.

The YARN clusters 504 are examples of what are more generally referred to herein as "distributed processing node clusters." Thus, like the YARN clusters 104 of the FIG. 1 embodiment, each of the YARN clusters 504 is assumed to include a cluster of multiple computers or other processing devices. Other types of distributed processing node clusters or alternative arrangements of distributed processing nodes can be used in other embodiments. The use of Hadoop YARN in the FIG. 5 embodiment is by way of example only, and other embodiments need not utilize Hadoop YARN.

In the information processing system 500, there is a one-to-one correspondence between the WWH nodes 502 and the respective YARN clusters 504, although this is also by way of illustrative example only. In other embodiments, a given WWH node may be associated with multiple YARN clusters. Additionally or alternatively, a given YARN cluster can be associated with multiple WWH nodes.

It is also possible that one or more of the WWH nodes 502 may each comprise a data processing node of the corresponding YARN cluster 504. Thus, in some embodiments, the separate layers 501 and 503 of the FIG. 5 embodiment are merged into a single layer of YARN clusters one or more of which each include one or more WWH nodes. Such an arrangement is considered yet another illustrative example of a WWH platform, or more generally a multi-cluster distributed data processing platform, as those terms are broadly utilized herein. Again, other embodiments can be configured without the use of YARN clusters or other types of computing clusters. For example, in some embodiments, the YARN clusters 504 can be replaced with respective sets of one or more distributed processing nodes configured to communicate with one another over one or more networks.

As indicated above, the YARN clusters 504 in the FIG. 5 embodiment are assumed to be associated with respective distinct data zones. Each of the YARN clusters 504 is configured to perform processing operations utilizing local data resources locally accessible within its corresponding data zone. The YARN clusters as illustrated in the figure illustratively comprise respective processing platforms including various arrangements of multi-node clouds, possibly implemented utilizing virtual infrastructure components, and other example arrangements of distributed processing nodes.

By way of example, at least a subset of the YARN clusters 504 may comprise respective geographically-distributed regional data centers each configured to perform analytics processing utilizing the locally accessible data resources of its corresponding data zone. Additional or alternative types of boundaries may be used to separate the system 500 into multiple data zones. Accordingly, geographical distribution of the data zones and their respective clusters is not required.

The WWH nodes 502 illustratively utilize processing results from one or more of the YARN clusters 504 in orchestrating distributed GBSAS applications over multiple YARN clusters in the system 500. This is achieved in a manner that preserves the privacy of those clusters in their respective local data resources. For example, processing results from a given one of the clusters may be permitted to be transmitted to another one of the clusters while the local data resources of the given cluster that are utilized to obtain the processing results are not permitted to be transmitted to another one of the clusters.

In the FIG. 5 embodiment, each data zone is illustratively associated with a virtual node within a virtual computing cluster 505. The virtual nodes of the virtual computing cluster 505 illustratively include the WWH nodes 502 of the WWH node layer 501 and provide access to local datasets of respective ones of the data zones associated with respective YARN clusters 504 of the YARN cluster layer 503. Other types of virtual computing clusters comprising different arrangements of distributed processing nodes can be used in other embodiments. The term "virtual computing cluster" as used herein is therefore intended to be broadly construed, and should not be interpreted as being limited to WWH nodes or other particular types of distributed processing nodes.

Figure 6:
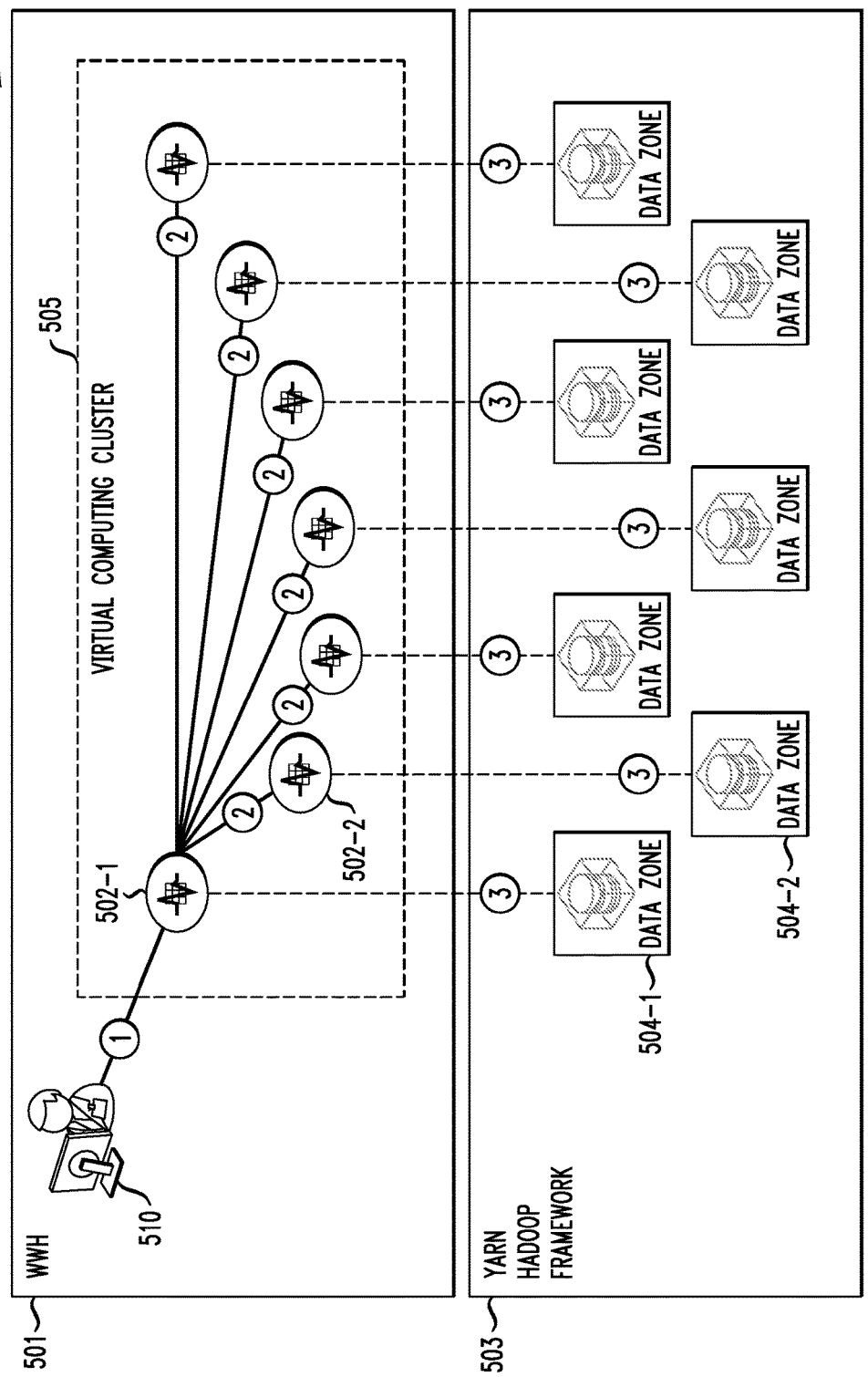
Figure 7:
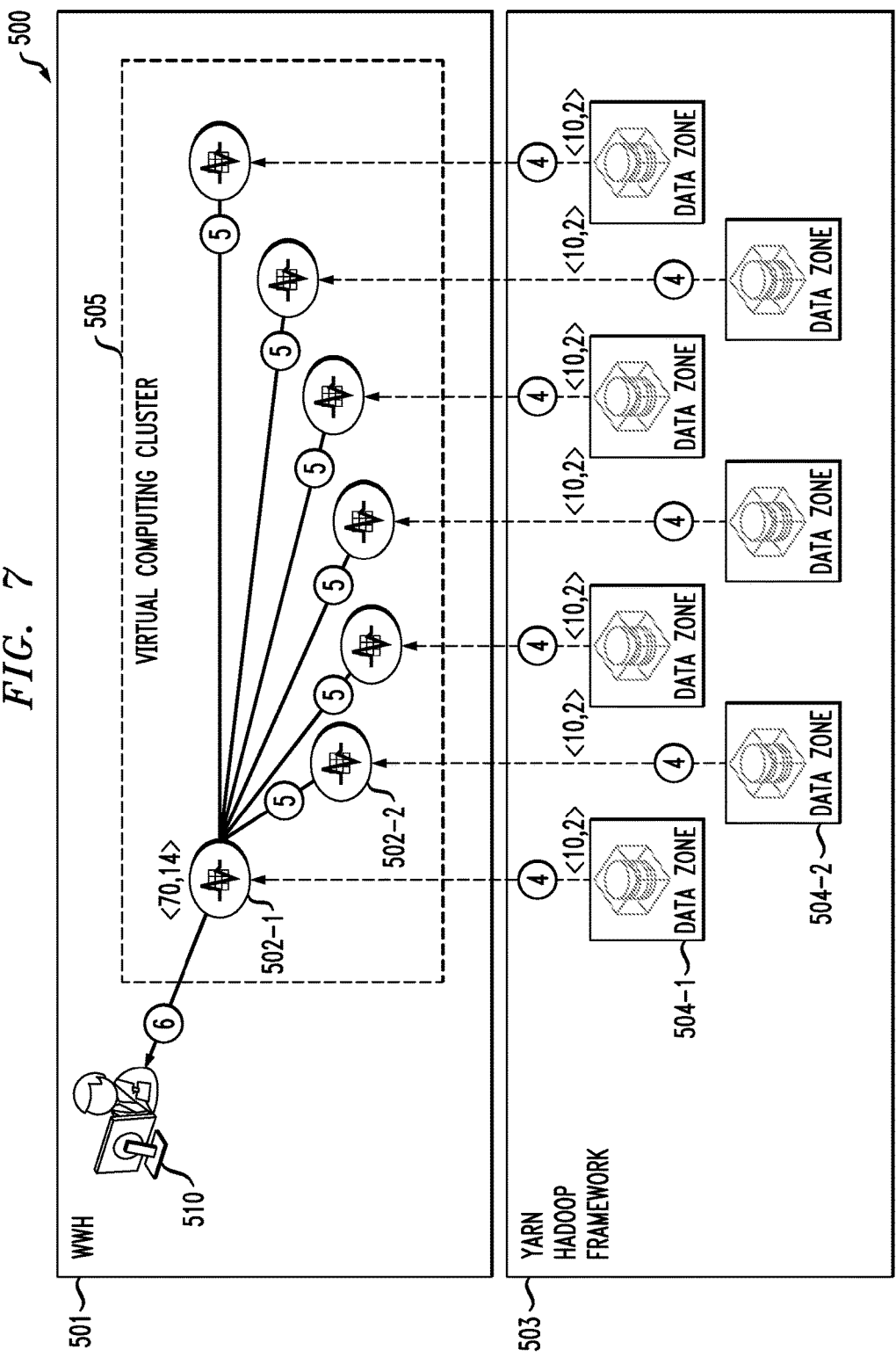

FIGS. 6 and 7 illustrate distributed data processing operations associated with implementation of GBSAS functionality in the system 500. The operations include process steps denoted by numerals 1 through 6, also referred to below as Step 1 through Step 6, respectively. Other process steps can be used in other embodiments.

As depicted in Step 1 of FIG. 6, a user 510 associated with WWH node 502-1 initiates a GBSAS computation in the system 500. The user 510 can be a human entity or an automated entity, such as a computer or software program. The WWH node 502-1 is one of the virtual nodes of the virtual computing cluster 505 and in this example is considered the initiating node for the GBSAS computation.

The GBSAS computation comprises at least two computation units:

1. Intermediate Calculation: to be performed in a distributed manner, at each data zone.

2. Global Calculation: to be performed at the initiating node, after the results of the intermediate calculations have been received.

It is important to note that a more complex GBSAS may comprise several iterations of Intermediate and Global Calculations, where at each iteration the initiating node may share results of the previous iteration with the virtual nodes in the virtual computing cluster 505, by passing these values as parameters to the next Intermediate Calculation.

Even though the virtual computing cluster 505 depicted in FIG. 5 shows a flat arrangement, where there is just one layer 501 of WWH nodes 502 associated with respective data zones, in other WWH embodiments a virtual computing cluster may be implemented using a recursive arrangement in which any one of the virtual nodes can itself actually point to one or more other virtual nodes and so on.

The submission of a GBSAS computation to the initiating node 502-1 in Step 1 causes a WWH computation to start, which illustratively calls one or more microservices in a WWH Catalog running in the initiating node 502-1 to locate all the other virtual nodes where the Intermediate Calculations should be sent. In this particular example, it is assumed that all the other WWH nodes 502 in the virtual computing cluster 505 will participate in the GBSAS computation and, as a result, the WWH functionality in the initiating node 502-1 distributes the Intermediate Calculations to respective ones of the additional WWH nodes 502, as depicted in Step 2 of FIG. 6. These Intermediate Calculations are distributed by the WWH nodes 502 to respective ones of the YARN clusters 504 as depicted in Step 3 of FIG. 6. The YARN clusters 504 then execute the Intermediate Calculations utilizing local datasets of their respective data zones.

Upon completion of its Intermediate Calculation, each one of the YARN clusters 504 associated with a corresponding one of the data zones sends the results of its computation back to its requesting one of the WWH nodes 502, as depicted in Step 4 of FIG. 7. All of the WWH nodes 502 other than the initiating node 502-1 sends its corresponding Intermediate Calculation result back to the initiating node 502-1, as depicted in Step 5 of FIG. 7. These results include all the information that will be required for the calculation of the global benchmarking, but without sending any Personally Identifiable Information (PII) and while seeking to minimize the amount of data that is actually sent to the initiating node 502-1.

The global computation performed by the initiating node 502-1 may be viewed as aggregating local results from the other WWH nodes 502 into global results. The global results are utilized in performing one or more benchmarking operations, such as generating a global histogram of the type previously described, possibly with local placement of results from the local data zone of the initiating node 502-1 into the global histogram.

The WWH framework in some embodiments includes the above-noted WWH Catalog, which illustratively comprises a distributed network of collaborative and cooperating nodes that implement a metadata-driven mechanism to address and to access data and other "things," located in a distributed manner across the nodes in the network, potentially geographically dispersed worldwide, where the knowledge of where the "thing" actually resides and how it can be accessed may only be known locally to the node where the "thing" is located.

In the context of WWH, the metadata is an abstraction of a "thing," that enriches and describes properties about the "thing" with information above and beyond what is inherent in the "thing" itself. The term "metadata-driven" refers to methods and approaches that leverage metadata to locate, access, analyze, or manage "things." A "meta-resource" as that term is used herein is an abstraction of a set of resources that enriches the resources with metadata above and beyond the resources themselves, describing characteristics shared by all the resources represented by the meta-resource. The resources represented by a meta-resource may be physically co-located or distributed geographically, around the world.

The WWH framework in some embodiments includes the following illustrative features and functionality.

The WWH framework decouples two world wide scale functions, implemented as a set of microservices, namely, the WWH Catalog, which provides a metadata-driven abstraction and mechanism to address and to access data scattered worldwide, and the WWH Computing Framework, which provides an orchestration method to distribute and push computation close to the data.

The WWH framework illustratively comprises a unique combination of these two decoupled and independent functions, allowing users to distribute computation without knowing or being exposed to the exact location of the data. In addition, the WWH Framework allows data to move location, and allows data to be added and removed without requiring changes to the distributed application, while also allowing the application to always compute on the most recent set of data available.

Several implementations of the WWH Catalog can cooperate to deliver the services published, where each implementation best uses the resources available to them and best delivers on the requirements.

The WWH framework allows for the implementation and automation of GBSAS calculations. For example, the WWH framework can be used to identify and locate the datasets required for a particular GBSAS computation. In a given WWH Catalog of datasets upon which a GBSAS computation can be performed, a meta-resource gbsas_meta_resource$_{D_n}$ is created to identify and represent the set of datasets, $D_n=\{d_1, d_2, \ldots, d_n\}$, and the addresses of the respective locations of the datasets and of their respective affiliated computing nodes, thereby allowing each dataset to be reached in a programmatic and digital manner. The WWH framework also allows implementation of an application comprising a set of iterations and a final calculation. Each iteration can itself be implemented as a WWH application, possibly utilizing one or more microservices that issue calls to the WWH framework, and that pass as parameters to the WWH framework the meta-resource gbsas_meta_resource$_{D_n}$, the Intermediate Calculation for the corresponding iteration with all parameters, and the Global Computation for this iteration with all parameters.

WWH GBSAS Histogram Use Case Implementation

The WWH framework described above can be used to perform local and global computations for the GBSAS histogram use case implementations disclosed herein, as well as similar computations for numerous other GBSAS use cases.

WWH GBSAS Histogram Use Case Implementation in a Multi-Cloud Environment

In some embodiments, the datasets $d_i$ in $D_n=\{d_1, d_2, \ldots, d_n\}$ are hosted in multiple cloud instances, possibly but not necessarily from the same cloud vendor. Accordingly, the datasets may be located on respective different cloud instances from the same cloud vendor, such as Virtustream, Amazon Web Services (AWS), MS Azure, Google Cloud Platform, and SalesForce.com. Such clouds can illustratively include VMware-based clouds, soft stack based clouds, cluster-based clouds or other cloud implementations. Alternatively, the datasets can be located in respective clouds of different types from different cloud vendors. Hybrid arrangements are also possible, in which some of the datasets are located on one or more instances of the same type of cloud from the same cloud vendor and other ones of the datasets are located on respective distinct clouds from other cloud vendors.

The WWH framework can be used in the above-described multi-cloud scenarios. In these scenarios, the WWH Catalog is illustratively configured to create a meta-resource gbsas_meta_resource$_{D_n}$ identify and represent the set of datasets, $D_n=\{d_1, d_2, \ldots, d_n\}$, and the addresses in the particular cloud instances where respective ones of the datasets are located. For every instance of a cloud that hosts a dataset $d_i$, an entry is added to the WWH Catalog that indicates how all the physical data resources representing the dataset $d_i$ can be accessed. For example, a dataset $d_i$ may be spread across m different files. The dataset $d_i$ may be represented in the WWH Catalog hosting $d_i$ as a meta-resource gbsas_meta_resource$_{d_i}$ that points to m different file names and locations within the instance of the cloud where it is hosted.

In order to make it easier to refer to WWH microservices, the WWH microservices can be implemented and registered as respective services in the cloud, if supported.

In some embodiments, the WWH framework can be ported to run on top of an Apache implementation of the Hadoop YARN framework supported by the cloud.

The WWH framework in the multi-cloud scenarios also allows implementation of an application comprising a set of iterations and a final calculation. Each iteration can itself be implemented as a WWH application, possibly utilizing one or more microservices that issue calls to the WWH framework, and that pass as parameters to the WWH framework the meta-resource gbsas_meta_resource$_{D_n}$, the Intermediate Calculation for the corresponding iteration with all parameters, and the Global Computation for this iteration with all parameters.

WWH GBSAS Histogram Use Case Implementation on MS Azure

In some embodiments, the datasets $d_i$ in $D_n=\{d_1, d_2, \ldots, d_n\}$ will be hosted in instances of the MS Azure cloud. Each of the datasets may be located in a different instance of the MS Azure cloud. Alternatively, all the datasets may be co-located in the same instance of the MS Azure cloud. Hybrid arrangements are possible, in which some of the datasets are dispersed across several instances of the MS Azure cloud while other datasets are co-located in the same instance of the MS Azure cloud.

It is important to note that the fact that at least some datasets may be co-located in the same instance of the cloud does not necessarily mean that they are physically located next to each other or that they will be analyzed in the same computing cluster, or sharing the same affiliated computing cluster. For example, these datasets may also be virtually isolated from one another within a given cloud instance, with each one being separately managed and accessible utilizing a different login.

The WWH framework can be used in the above-described MS Azure cloud scenarios. In these scenarios, the WWH Catalog is illustratively configured to create a meta-resource gbsas_meta_resource$_{D_n}$ identify and represent the set of datasets, $D_n=\{d_1, d_2, \ldots, d_n\}$, and the addresses in the particular MS Azure cloud instances where respective ones of the datasets are located. Other functionality of the WWH framework and WWH Catalog in the MS Azure cloud scenarios is implemented in a manner similar to that previously described in the context of multi-cloud scenarios. Additionally or alternatively, in some embodiments involving one or more MS Azure cloud scenarios, the WWH framework can be ported to run on top of an MS HD Insight implementation.

Illustrative embodiments disclosed herein overcome numerous problems that would otherwise arise in a variety of situations in which the data required for analytics is scattered across many sites or clouds, potentially geographically dispersed around the world, where each location only has visibility to its own set of data, also referred to herein as a dataset. These sites or clouds may be viewed as illustrative examples of what are more generally referred to herein as data zones. Some embodiments assume that the datasets that each site or cloud collects are locked-in within its corresponding data zone, meaning that the dataset cannot move outside of specified boundaries of the site or cloud. There may be a variety of factors preventing the data from moving, including the data size that imposes severe bandwidth delays or huge transmission costs, privacy issues that prohibit the data from being shared, or GRC regulatory requirements that demand that the data remain in site.

Some embodiments allow benchmarking and statistical analysis of large datasets to be performed at scale, even when the data is scattered across several locations. These embodiments capitalize on the fact that the distributed nature of the data may actually be an advantage as it enables the parallel and distributed analytics of the data, instead of fighting against the distribution of the data, forcing the data to actually be first moved and physically aggregated in a single location, which may take a long time, may require innumerous legalities to be first processed, and may render the entire analytics completely infeasible.

These embodiments allow benchmarking and statistical analytics to be performed using distributed and parallel computation. For example, some embodiments implement parallel and distributed computation of histograms, one of the most common ways to do analysis through comparison.

Some embodiments configure distributed and parallel versions of benchmarking and statistical analysis in which computations are expressed in a programmatic manner, the datasets that should participate in a given computation are expressed in a declarative manner, the location of the nodes is automated, and the execution of the computations is orchestrated to be close to the location of the data. The analytics can be implemented on top of data scattered in a cloud or across several clouds, including MS Azure clouds.

Illustrative embodiments implement benchmarking and statistical analysis in a parallel and distributed manner using WWH frameworks. For example, some embodiments illustrate how benchmarking through histograms can be programmatically expressed and automated using WWH frameworks.

By way of example, given a set of data that is scattered across the world in many data zones, a benchmarking computation may need to be carried out in order to calculate and compare specific metrics across all relevant data on the data zones. Such a computation is illustratively divided into multiple phases as follows:

1. A benchmarking job is submitted to a WWH node associated with a particular one of the data zones.

2. The job is distributed to other WWH nodes associated with respective other data zones which have data relevant to the benchmarking job.

3. On each of the data zones a local benchmark computation function is carried out. For instance, an average, maximum or minimum is computed over the relevant data within each of the data zones.

4. The local results, which are much smaller in size than the original data and include only computational values, are transferred using the WWH framework to the data zone where the job was initiated.

5. The results are aggregated using a WWH global reducer function and compared to a desired value.

Numerous other types of computations can be performed using other distinct arrangements of phases in other embodiments.

Some embodiments provide a methodology and approach to formulate or design benchmarking and statistical analysis in a parallel and distributed manner.

Some embodiments provide a framework to orchestrate the federated execution of benchmarking at worldwide scale, across distributed data processing clusters that are geographically dispersed.

Some embodiments provide an abstraction that addresses data scattered worldwide and can be used to determine and orchestrate benchmarking computations without moving the data between the data zones.

In illustrative embodiments, techniques are provided that automate global benchmarking at scale, allowing a value of one, or more, instances of local known data to be compared with several datasets that reside on different data zones.

For example, the data zones can represent different branches of a bank. The data that resides in the data zone can be the deposits and withdrawals of the customers. In this case every transaction has its money value. The bank may want to calculate a Global Benchmarking on the customers, in all the branches. There are many metrics that can be of an interest, such as the average value of a transaction, the maximum value of a transaction, and the number of transactions made for each weekday. The bank may want to calculate the metrics based on certain parameters, some of them belonging to the customers and the others belonging to the transaction itself. The output of the benchmarking can be presented in any tool used in statistics analysis, for instance a histogram or a pie chart.

Such an embodiment is illustratively configured to run a WWH Microservice on one of the data zones that initiates the benchmarking job. It first runs a local reduce function on that calculates the metrics over the data that resides locally and then distributes the same computation on all the relevant data zones and run the same local reduce function. The results, which are aggregated values of the metrics, are sent back to the initiated data zone. A global reducer function collects all the results and calculates the joint metrics for the entire data. The WWH Microservice ends by showing the benchmark output in text or preferably in a graphical manner, for instance a histogram.

As a more particular example, consider a bank with three branches, each branch having its own data zone. Each customer is considered as an entity and has its attributes: age, sex (0—male, 1—female) and the date that the customer joined the branch (measured as an integer). The samples are all the deposits and withdrawals. For each sample the value is the amount of the action (positive for deposit and negative for withdrawal) and the parameters are the timestamp of the action. The benchmark is declared as compare customer $e_i$ average deposit in the last fiscal year with the entire average deposits of all the customers that have the same sex and are 5 years younger or older than this customer.

Illustrative embodiments provide an approach to divide benchmarking and statistical analytics into iterations, where each iteration comprises Intermediate Calculations to be performed in each data zone in parallel and in distributed locations, and to combine the results of the individual computations to analyze and aggregate the results. This approach is an example of what is more generally referred to herein as GBSAS. GBSAS can be used to create global scale histograms, for example.

A WWH framework is used in some embodiments to automate the implementation of GBSAS. For example, the WWH framework can be used to implement the above-described GBSAS use case of histogram generation, where the datasets and the affiliated computing nodes reside on clouds, such as MS Azure clouds.

The multi-cluster distributed data processing platforms and other arrangements of distributed processing nodes in illustrative embodiments disclosed herein provide significant advantages relative to conventional arrangements.

For example, as mentioned previously, some illustrative embodiments move the computation instead of moving the data and create an abstraction to distributed Big Data in order to overcome the drawbacks of conventional systems, providing significant advantages in terms of both performance and privacy, and related advantages such as the facilitation of GRC, as outlined in detail elsewhere herein.

These and other advantages of some illustrative embodiments are described in more detail in FIG. 8. Such advantages are present in some illustrative embodiments and need not be present in other embodiments.

It is to be appreciated that the particular types of system features and functionality as illustrated in the drawings and described above are exemplary only, and numerous other arrangements may be used in other embodiments.

For example, as indicated previously, illustrative embodiments can be implemented using a wide variety of different arrangements of distributed processing nodes, and should not be viewed as requiring WWH, YARN or Hadoop.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as WWH nodes 102 and YARN clusters 104 of the FIG. 1 embodiment, or portions thereof, can be implemented as respective tenants of such a multi-tenant environment. Other embodiments can be similarly configured using multi-tenant embodiments.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system 100, although in other embodiments a given tenant can have multiple containers. The containers may be utilized to implement a variety of different types of functionality within the system 100. For example, containers can be used to implement respective cloud compute nodes or cloud storage nodes of a cloud computing and storage system. The compute nodes or storage nodes may be associated with respective cloud tenants of a multi-tenant environment of system 100. Containers may be used in combination with other virtualization infrastructure such as virtual machines implemented using a hypervisor. References above to features of system 100 are not limited to that system only, and such features can be extended to other systems in other illustrative embodiments, such as system 300 and system 500.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing PCIe cards of those devices, and networking protocols such as InfiniBand, Gigabit Ethernet or Fibre Channel.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of a given YARN cluster or associated data processing node in a particular embodiment are illustratively implemented in the form of software running on one or more processing devices.

It should again be emphasized that the above-described embodiments of the invention are presented for purposes of illustration only. Many variations and other alternative embodiments may be used. For example, the disclosed techniques are applicable to a wide variety of other types of information processing systems, distributed data processing platforms, application frameworks, processing nodes, local and remote data resources and other components. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
receiving results of intermediate statistical computations performed on respective ones of a plurality of datasets in respective ones of a plurality of distributed processing nodes configured to communicate over at least one network;
performing at least one global statistical computation based at least in part on the results of the intermediate statistical computations; and
utilizing a result of the global statistical computation to perform one or more benchmarking operations for specified parameters relating to the plurality of datasets;
wherein the distributed processing nodes are associated with respective distinct data zones in which the respective datasets are locally accessible to the respective distributed processing nodes;
wherein the global statistical computation comprises at least one of:
computing a global standard deviation of values for a specified parameter based at least in part on sums of differences of the values for the specified parameter determined for respective ones of the datasets as part of respective ones of the intermediate statistical computations and wherein the intermediate statistical computations determine the sums of differences relative to a global average of values for the specified parameter as determined in another global statistical computation performed in a previous iteration; and
computing a global histogram of values for a specified parameter based at least in part on histogram pair lists of the values for the specified parameter determined for respective ones of the datasets as part of respective ones of the intermediate statistical computations wherein a given one of the histogram pair lists comprises a list of histogram slices with corresponding numbers of items in those histogram slices and wherein the intermediate statistical computations determine the histogram pair lists based at least in part on inputs including a minimum value, a maximum value and a number of histogram slices to be included in the corresponding histogram; and
wherein the method is performed by at least one processing device comprising a processor coupled to a memory.

2. The method of claim 1 further comprising:
repeating at least a subset of the receiving, performing and utilizing in each of a plurality of iterations; and
passing a result of the global statistical computation in a first one of the iterations as an input to the intermediate statistical computations in a second one of the iterations.

3. The method of claim 1 wherein the intermediate statistical computations are initiated by an initiating distributed processing node.

4. The method of claim 3 wherein the initiating distributed processing node is configured to perform the global statistical computation.

5. The method of claim 1 wherein the global statistical computation is performed at a same one of the distributed processing nodes that performs one of the intermediate statistical computations.

6. The method of claim 1 wherein the global statistical computation comprises computing a global average of values for a specified parameter based at least in part on sums of the values and number of values summed for the specified parameter determined for respective ones of the datasets as part of respective ones of the intermediate statistical computations.

7. The method of claim 1 wherein the global statistical computation comprises computing at least one of a global minimum and a global maximum of values for a specified parameter based at least in part on at least one of minimums and maximums of the values for the specified parameter determined for respective ones of the datasets as part of respective ones of the intermediate statistical computations.

8. A method comprising:
receiving results of intermediate statistical computations performed on respective ones of a plurality of datasets in respective ones of a plurality of distributed processing nodes configured to communicate over at least one network;
performing at least one global statistical computation based at least in part on the results of the intermediate statistical computations; and
utilizing a result of the global statistical computation to perform one or more benchmarking operations for specified parameters relating to the plurality of datasets;
wherein the distributed processing nodes are associated with respective distinct data zones in which the respective datasets are locally accessible to the respective distributed processing nodes;
wherein the global statistical computation comprises computing at least one of a global minimum set and a global maximum set of values for a specified parameter based at least in part on at least one of minimum sets and maximum sets of the values for the specified parameter determined for respective ones of the datasets as part of respective ones of the intermediate statistical computations; and
wherein the method is performed by at least one processing device comprising a processor coupled to a memory.

9. The method of claim 8 wherein the global statistical computation further comprises computing a global standard deviation of values for a specified parameter based at least in part on sums of differences of the values for the specified parameter determined for respective ones of the datasets as part of respective ones of the intermediate statistical computations and wherein the intermediate statistical computations determine the sums of differences relative to a global average of values for the specified parameter as determined in another global statistical computation performed in a previous iteration.

10. The method of claim 8 wherein the global statistical computation further comprises computing a global histogram of values for a specified parameter based at least in part on histogram pair lists of the values for the specified parameter determined for respective ones of the datasets as part of respective ones of the intermediate statistical computations wherein a given one of the histogram pair lists comprises a list of histogram slices with corresponding numbers of items in those histogram slices and wherein the intermediate statistical computations determine the histogram pair lists based at least in part on inputs including a minimum value, a maximum value and a number of histogram slices to be included in the corresponding histogram.

11. The method of claim 1 wherein at least one of the distributed processing nodes further performs in a subsequent iteration an additional intermediate statistical computation that receives as an input the global histogram and characterizes local placement of one or more values from its corresponding dataset within the global histogram.

12. The method of claim 1 wherein one or more of the minimum value and the maximum value are determined in at least one other global statistical computation performed in at least one previous iteration.

13. The method of claim 1 wherein the intermediate statistical computations performed on respective ones of a plurality of datasets are performed on respective subsets of the datasets and wherein each of the subsets is determined by application of at least one of an extraction operation and a transformation operation to the corresponding dataset.

14. The method of claim 1 wherein at least a subset of the distributed processing nodes are implemented in respective data processing clusters corresponding to respective ones of the data zones and wherein the clusters comprise respective cloud-based data centers each configured to store locally accessible datasets of its corresponding data zone in a manner that satisfies one or more specified policies relating to at least one of privacy, security, governance, risk and compliance.

15. A computer program product comprising a non-transitory processor-readable storage medium having stored therein program code of one or more software programs, wherein the program code when executed by at least one processing device causes said at least one processing device:
to receive results of intermediate statistical computations performed on respective ones of a plurality of datasets in respective ones of a plurality of distributed processing nodes configured to communicate over at least one network;
to perform at least one global statistical computation based at least in part on the results of the intermediate statistical computations; and
to utilize a result of the global statistical computation to perform one or more benchmarking operations for specified parameters relating to the plurality of datasets;
wherein the distributed processing nodes are associated with respective distinct data zones in which the respective datasets are locally accessible to the respective distributed processing nodes; and
wherein the global statistical computation comprises at least one of:
computing a global standard deviation of values for a specified parameter based at least in part on sums of differences of the values for the specified parameter determined for respective ones of the datasets as part of respective ones of the intermediate statistical computations and wherein the intermediate statistical computations determine the sums of differences relative to a global average of values for the specified parameter as determined in another global statistical computation performed in a previous iteration; and
computing a global histogram of values for a specified parameter based at least in part on histogram pair lists of the values for the specified parameter determined for respective ones of the datasets as part of respective ones of the intermediate statistical computations wherein a given one of the histogram pair lists comprises a list of histogram slices with corresponding numbers of items in those histogram slices and wherein the intermediate statistical computations determine the histogram pair lists based at least in part on inputs including a minimum value, a maximum value and a number of histogram slices to be included in the corresponding histogram.

16. The computer program product of claim 15 wherein at least a subset of the receiving, performing and utilizing are repeated in each of a plurality of iterations and wherein a result of the global statistical computation in a first one of the iterations is passed as an input to the intermediate statistical computations in a second one of the iterations.

17. The computer program product of claim 15 wherein at least a subset of the distributed processing nodes are implemented in respective data processing clusters corresponding to respective ones of the data zones and wherein the clusters comprise respective cloud-based data centers each configured to store locally accessible datasets of its corresponding data zone in a manner that satisfies one or more specified policies relating to at least one of privacy, security, governance, risk and compliance.

18. An apparatus comprising:
at least one processing device having a processor coupled to a memory;
wherein said at least one processing device is configured:
to receive results of intermediate statistical computations performed on respective ones of a plurality of datasets in respective ones of a plurality of distributed processing nodes configured to communicate over at least one network;
to perform at least one global statistical computation based at least in part on the results of the intermediate statistical computations; and
to utilize a result of the global statistical computation to perform one or more benchmarking operations for specified parameters relating to the plurality of datasets;
wherein the distributed processing nodes are associated with respective distinct data zones in which the respective datasets are locally accessible to the respective distributed processing nodes; and
wherein the global statistical computation comprises at least one of:
computing a global standard deviation of values for a specified parameter based at least in part on sums of differences of the values for the specified parameter determined for respective ones of the datasets as part of respective ones of the intermediate statistical computations and wherein the intermediate statistical computations determine the sums of differences relative to a global average of values for the specified parameter as determined in another global statistical computation performed in a previous iteration; and
computing a global histogram of values for a specified parameter based at least in part on histogram pair lists of the values for the specified parameter determined for respective ones of the datasets as part of respective ones of the intermediate statistical computations wherein a given one of the histogram pair lists comprises a list of histogram slices with corresponding numbers of items in those histogram slices and wherein the intermediate statistical computations determine the histogram pair lists based at least in part on inputs including a minimum value, a maximum value and a number of histogram slices to be included in the corresponding histogram.

19. The apparatus of claim 18 wherein at least a subset of the receiving, performing and utilizing are repeated in each of a plurality of iterations and wherein a result of the global statistical computation in a first one of the iterations is passed as an input to the intermediate statistical computations in a second one of the iterations.

20. The apparatus of claim 18 wherein at least a subset of the distributed processing nodes are implemented in respective data processing clusters corresponding to respective ones of the data zones and wherein the clusters comprise respective cloud-based data centers each configured to store locally accessible datasets of its corresponding data zone in a manner that satisfies one or more specified policies relating to at least one of privacy, security, governance, risk and compliance.

* * * * *